US011153034B2

(12) United States Patent
Golitschek Edler Von Elbwart et al.

(10) Patent No.: US 11,153,034 B2
(45) Date of Patent: Oct. 19, 2021

(54) CHANNEL STATE INFORMATION REPORTING ON LICENSED AND UNLICENSED CARRIERS

(71) Applicant: Panasonic Intellectual Property Corporation of America, Torrance, CA (US)

(72) Inventors: Alexander Golitschek Edler Von Elbwart, Hessen (DE); Michael Einhaus, Hessen (DE); Sujuan Feng, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/122,862

(22) Filed: Dec. 15, 2020

(65) Prior Publication Data
US 2021/0143934 A1 May 13, 2021

Related U.S. Application Data

(63) Continuation of application No. 16/665,819, filed on Oct. 28, 2019, now Pat. No. 10,903,935, which is a (Continued)

(30) Foreign Application Priority Data

Nov. 20, 2014 (EP) .................................... 14003910

(51) Int. Cl.
*H04L 1/00* (2006.01)
*H04B 7/06* (2006.01)
(Continued)

(52) U.S. Cl.
CPC ......... *H04L 1/0026* (2013.01); *H04B 7/0456* (2013.01); *H04B 7/0626* (2013.01);
(Continued)

(58) Field of Classification Search
CPC ..... H04L 5/005; H04L 5/0094; H04L 5/0001; H04L 5/0023; H04L 5/0057; H04W 28/04;
(Continued)

(56) References Cited

U.S. PATENT DOCUMENTS 10,505,669 B2 12/2019 Golitschek Edler von Elbwart et al.
10,903,935 B2 * 1/2021 Golitschek Edler Von Elbwart ............... H04B 7/0632
(Continued)

FOREIGN PATENT DOCUMENTS

EP 2 654 356 A1 10/2013
JP 5592559 B2 9/2014
(Continued)

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213, 3GPP, Sep. 2014, V12.3.0, pp. 64-71.
(Continued)

*Primary Examiner* — Lee Nguyen
(74) *Attorney, Agent, or Firm* — Seed IP Law Group LLP

(57) ABSTRACT

A user equipment includes a receiver and a transmitter and is configured to report channel state information (CSI) to a base station in a communication system in which a plurality of downlink component carriers and at least one uplink component carrier are configured. The receiver receives, in a slot nTrigger, a trigger message that triggers reporting of
(Continued)

the CSI for at least one unlicensed downlink component carrier of the plurality of downlink component carriers. The transmitter transmits, in a slot nReport, the CSI based on reference signals present in a slot nRS on the at least one unlicensed downlink component carrier. Responsive to the at least one unlicensed downlink component carrier being occupied for a period of time for a bursty downlink transmission, only the reference signals in the slot nRS are evaluated for the CSI, and other slots in the period of time are not evaluated for the CSI.

16 Claims, 19 Drawing Sheets

Related U.S. Application Data continuation of application No. 15/594,938, filed on May 15, 2017, now Pat. No. 10,505,669, which is a continuation of application No. PCT/JP2015/003805, filed on Jul. 29, 2015.

(51) Int. Cl.
| | | |
|---|---|---|
| *H04L 5/00* | (2006.01) | |
| *H04B 7/0456* | (2017.01) | |
| *H04L 1/06* | (2006.01) | |
| *H04W 28/04* | (2009.01) | |
| *H04W 72/04* | (2009.01) | |
| *H04L 1/18* | (2006.01) | |

(52) U.S. Cl.
CPC ......... *H04B 7/0632* (2013.01); *H04L 1/0693* (2013.01); *H04L 5/005* (2013.01); *H04L 5/0094* (2013.01); *H04W 28/04* (2013.01); *H04W 72/042* (2013.01); *H04W 72/0413* (2013.01); *H04B 7/063* (2013.01); *H04B 7/0639* (2013.01); *H04L 1/1896* (2013.01); *H04L 5/001* (2013.01); *H04L 5/0023* (2013.01); *H04L 5/0057* (2013.01)

(58) Field of Classification Search
CPC ............ H04W 72/0413; H04W 72/042; H04B 7/0456; H04B 7/0626; H04B 7/0632; H04B 7/063; H04B 7/0639
USPC .................................. 370/241, 252
See application file for complete search history.

(56) References Cited

U.S. PATENT DOCUMENTS

| | | |
|---|---|---|
| 2011/0317657 A1 | 12/2011 | Chmiel et al. |
| 2013/0142134 A1 | 6/2013 | Zhu et al. |
| 2014/0036881 A1 | 2/2014 | Kim et al. |
| 2014/0126476 A1 | 5/2014 | Kang et al. |
| 2014/0308905 A1 | 10/2014 | Miao et al. |
| 2014/0369293 A1 | 12/2014 | Guo et al. |
| 2015/0236839 A1 | 8/2015 | Shah et al. |
| 2016/0007350 A1 | 1/2016 | Xiong et al. |
| 2016/0381587 A1 | 12/2016 | Alexey et al. |

FOREIGN PATENT DOCUMENTS

| | | |
|---|---|---|
| WO | 2010/144875 A2 | 12/2010 |
| WO | 2012/078565 A1 | 6/2012 |

OTHER PUBLICATIONS

3GPP TS 36.211, "Evolved Universal Terrestrial Radio Access (E-UTRA); Physical channels and modulation", version 10.0.0, Dec. 2010.
3GPP TS 36.212, "Evolved Universal Terrestrial Radio Access (E-UTRA); Multiplexing and channel coding", version 10.0.0, Dec. 2010.
3GPP TS 36.213, "Evolved Universal Terrestrial Radio Access (E-UTRA); Physical layer procedures", version 10.0.1, Dec. 2010.
CATT, Remaining details on aperiodic CSI feedback for eIMTA [online], 3GPP TSG-RAN WG1#77, 3GPP, May 23, 2014, R1-141981, Search date [Apr. 19, 2019], Internet<URL:http://www.3gpp.org/ftp/tsg_ran/WG1_RL1/TSGR1_77/Docs//R1-141981.zip>.
Indian Examination Report dated Dec. 3, 2020 for the related Indian Patent Application No. 201747013889, 6 pages.
International Search Report of PCT application No. PCT/JP2015/003805 dated Oct. 20, 2015.
R1-144348, "Regulatory Requirements for Unlicensed Spectrum", Alcatel-Lucent et al., 3GPP TSG RAN1#78bis, Sep. 2014.
Russian Search Report dated May 11, 2018 for the related Russian Patent Application No. 2017113453.
Samsung (rapporteur), Email discussion report on [79b#34] [LTE/COMP] CoMP Open issues [online], 3GPP TSG-RAN WG2#80, 3GPP, Nov. 16, 2012, R2-125718, Search date [Apr. 19, 2019], Internet<URL:http://www.3gpp.org/ftp/tsg_ran/WG2_RL2/TSGR2_80/Docs/R2-125718.zip>.
3rd Generation Partnership Project; Technical Specification Group Radio Access Network; Evolved Universal Terrestrial Radio Access (E-UTRA); Physical layer procedures (Release 10), 3GPP Technical Specification 36.213 v10.0.1, Dec. 2010, 98 pages.
Extended European Search Report dated Apr. 6, 2021 for the related European Patent Application No. 20210849.4, 13 pages.

* cited by examiner

FIG. 11

| | | | | | | | | | | | | | |
|---|---|---|---|---|---|---|---|---|---|---|---|---|---|
| Ax | Ax | | | D7-8 | | | | | | D7-8 | | | |
| Bx | Bx | | P0 | D9-10 | P1 | P3 | | | P0 | D9-10 | | | |
| Cx | Cx | | | | | | | | | | | | |
| Ay | Ay | | | | | | | | | | | | |
| By | By | | P1 | | P0 | P2 | | | P1 | | | | |
| Cy | Cy | | | D7-8 | | | | | | D7-8 | | | |
| Az | Az | | | D9-10 | | | | | | D9-10 | | | |
| Bz | Bz | | P0 | | P1 | P3 | | | P0 | | | | |
| Cz | Cz | | | | | | | | | | | | |
| Au | Au | | | | | | | | | | | | |
| Bu | Bu | | P1 | D7-8 | P0 | P2 | | | P1 | D7-8 | | | |
| Cu | Cu | | | D9-10 | | | | | | D9-10 | | | |

$k'=0..11$ $l'=0..6$  $l'=0..6$
$n_S \bmod 2 = 0$  $n_S \bmod 2 = 1$

FIG. 12

| Ax | Ax |    |        | D7-8  | Mx | Mx |    |    | D7-8  |
|----|----|----|--------|-------|----|----|----|----|-------|
| Bx | Bx |    | P0     | D9-10 | Nx | Nx |    | P0 | D9-10 |
| Cx | Cx |    |        |       | Ox | Ox |    |    |       |
| Dx | Dx |    |        |       | Px | Px |    |    |       |
| Ex | Ex |    | P1     |       | Qx | Qx |    | P1 |       |
| Fx | Fx |    |        | D7-8  | Rx | Rx |    |    | D7-8  |
| Gx | Gx |    |        | D9-10 | Sx | Sx |    |    | D9-10 |
| Hx | Hx |    | P0     |       | Tx | Tx |    | P0 |       |
| Ix | Ix |    |        |       | Ux | Ux |    |    |       |
| Jx | Jx |    |        |       | Vx | Vx |    |    |       |
| Kx | Kx |    | P1     | D7-8  | Yx | Yx |    | P1 | D7-8  |
| Lx | Lx |    |        | D9-10 | Zx | Zx |    |    | D9-10 |

↑ $k'=0..11$

← $l'=0..6$ → ← $l'=0..6$ →
$n_S \bmod 2 = 0$     $n_S \bmod 2 = 1$

FIG. 18

| | | | | | | | | | | | | |
|---|---|---|---|---|---|---|---|---|---|---|---|---|
| D7-8 | | | | | | | | | | | D7-8 | |
| D9-10 | | | P0 | | | P1 | P3 | | | P0 | D9-10 | |
| Ax | Ax | | | | | | | | | | Az | Az |
| Bx | Bx | | | | | | | | | | Bz | Bz |
| Cx | Cx | | | P1 | | | P0 | P2 | | P1 | Cz | Cz |
| D7-8 | | | | | | | | | | | D7-8 | |
| D9-10 | | | | | | | | | | | D9-10 | |
| Ay | Ay | | | P0 | | | P1 | P3 | | P0 | Au | Au |
| By | By | | | | | | | | | | Bu | Bu |
| Cy | Cy | | | | | | | | | | Cu | Cu |
| D7-8 | | | P1 | | | P0 | P2 | | | P1 | D7-8 | |
| D9-10 | | | | | | | | | | | D9-10 | |

$k'=0..11$ $l'=0..6$        $l'=0..6$ $n_S \bmod 2 = 0$        $n_S \bmod 2 = 1$

CHANNEL STATE INFORMATION REPORTING ON LICENSED AND UNLICENSED CARRIERS

BACKGROUND

1. Technical Field

The present disclosure relates to methods for reporting channel state information, CSI, from a mobile station to a base station in a mobile communication system, particularly on unlicensed carriers. The present disclosure is also providing mobile stations for performing the methods described herein.

2. Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective $N^{DL}_{RB} * N^{RB}_{sc}$ subcarriers as also shown in FIG. 4.

Assuming a multi-carrier communication system, e.g., employing OFDM, as, for example, used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g., 7 OFDM symbols) and $N^{RB}_{sc}$ consecutive subcarriers in the frequency domain as exemplified in FIG. 4 (e.g., 12 subcarriers for a component carrier). In 3GPP LTE (Release 8), a physical resource block thus consists of $N^{DL}_{symb}*N^{RB}_{sc}$ resource elements, corresponding to one slot in the time domain and 180 kHz in the frequency domain (for further details on the downlink resource grid, see, for example, 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N^{RB}_{sc}$ consecutive subcarriers spanning a full subframe are called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of a LTE Rel. 8/9 cell. Not all component carriers aggregated by a user equipment may necessarily be Rel. 8/9 compatible. Existing mechanism (e.g., barring) may be used to avoid Rel-8/9 user equipments to camp on a component carrier.

A user equipment may simultaneously receive or transmit one or multiple component carriers (corresponding to multiple serving cells) depending on its capabilities. A LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the 3GPP LTE (Release 8/9) numerology.

It is possible to configure a 3GPP LTE-A (Release 10) compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers.

In a typical TDD deployment, the number of component carriers and the bandwidth of each component carrier in uplink and downlink is the same. Component carriers originating from the same eNodeB need not provide the same coverage.

The spacing between centre frequencies of contiguously aggregated component carriers shall be a multiple of 300 kHz. This is in order to be compatible with the 100 kHz frequency raster of 3GPP LTE (Release 8/9) and at the same time preserve orthogonality of the subcarriers with 15 kHz spacing. Depending on the aggregation scenario, the n*300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

The Layer 2 structure with activated carrier aggregation is shown in FIG. 5 and FIG. 6 for the downlink and uplink respectively.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC).

The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover).

When a user equipment is configured with carrier aggregation there is at least one pair of uplink and downlink component carriers that is always active. The downlink component carrier of that pair might be also referred to as 'DL anchor carrier'. Same applies also for the uplink.

When carrier aggregation is configured, a user equipment may be scheduled on multiple component carriers simultaneously but at most one random access procedure shall be ongoing at any time. Cross-carrier scheduling allows the PDCCH of a component carrier to schedule resources on another component carrier. For this purpose a component carrier identification field is introduced in the respective DCI formats, called CIF.

A linking, established by RRC signaling, between uplink and downlink component carriers allows identifying the uplink component carrier for which the grant applies when there is no-cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Channel State Information Feedback Elements

Commonly, mobile communication systems define special control signalling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification
PMI: Precoding Matrix Indicator
RI: Rank Indicator The MCSI suggests a modulation and coding scheme that should be used for transmission, while the PMI points to a pre-coding matrix/vector that is to be employed for spatial multiplexing and multi-antenna transmission (MIMO) using a transmission matrix rank that is given by the RI. Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation" (3GPP TS 36.211, "Evolved Universal Terrestrial Radio Access (E-UTRA); Physical Channels and Modulation"), version 10.0.0, particularly sections 6.3.3 and 6.3.4;

3GPP TS 36.212, "Evolved Universal Terrestrial Radio Access (E-UTRA); Multiplexing and channel coding" (3GPP TS 36.212, "Evolved Universal Terrestrial Radio Access (E-UTRA); Multiplexing and channel coding", version 10.0.0), version 10.0.0, particularly sections 5.2.2, 5.2.4, and 5.3.3; and 3GPP TS 36.213, "Evolved Universal Terrestrial Radio Access (E-UTRA); Physical layer procedures"(3GPP TS 36.213, "Evolved Universal Terrestrial Radio Access (E-UTRA); Physical layer procedures", version 10.0.1), version 10.0.1, particularly sections 7.1.7 and 7.2.

In 3GPP LTE, not all of the above identified three channel quality elements are necessarily reported at the same time. The elements being actually reported depend mainly on the configured reporting mode. It should be noted that 3GPP LTE also supports the transmission of two codewords (i.e., two codewords of user data (transport blocks) may be multiplexed to and transmitted in a single sub-frame), so that feedback may be given either for one or two codewords. Some details are provided in the next sections and in Table 1 below for an exemplary scenario using a 20 MHz system bandwidth. It should be noted that this information is based on 3GPP TS 36.213, section 7.2.1 mentioned above.

The individual reporting modes for the aperiodic channel quality feedback are defined in 3GPP LTE as follows:

Reporting Mode 1-2
Contents of this Report:
One set S (i.e., wideband) MCSI value per codeword
One precoding matrix, represented by a PMI, for each subband
In some cases (See 3GPP TS 36.213 clause 7.2.1), additionally one set S (i.e., wideband) PMI value
In case of transmission modes 4, 8, 9, and 10: One RI value Reporting Mode 2-0
Contents of this Report:
One set S (i.e., wideband) MCSI value
Positions of M selected subbands
One MCSI value for the M selected subbands (2 bits differential to the set S MCSI value, non-negative)
In case of transmission mode 3: One RI value Reporting Mode 2-2
Contents of this Report:
One set S (i.e., wideband) MCSI value per codeword
One preferred PMI for set S (i.e., wideband)
Positions of M selected subbands
One MCSI value for the M selected subbands per codeword (2 bits differential to the corresponding set S MCSI value, non-negative)
One preferred PMI for M selected subbands—In some cases (See 3GPP TS 36.213 clause 7.2.1), additionally one set S (i.e., wideband) PMI value
In case of transmission modes 4, 8, 9, and 10: One RI value Reporting Mode 3-0
Contents of this Report:
One set S (i.e., wideband) MCSI value
One MCSI value per subband (2 bits differential to set S MCSI value)
In case of transmission mode 3: One RI value Reporting Mode 3-1
Contents of this Report:
One set S (i.e., wideband) MCSI value per codeword
One preferred PMI for set S (i.e., wideband)
In some cases (See 3GPP TS 36.213 clause 7.2.1), additionally one set S (i.e., wideband) PMI value
One MCSI value per codeword per subband (2 bits differential to them corresponding set S MCSI value)
In case of transmission modes 4, 8, 9, and 10: One RI value Reporting Mode 3-2
Contents of this Report:
One set S (i.e., wideband) MCSI value per codeword
One precoding matrix, represented by a PMI, for each subband—In some cases (See 3GPP TS 36.213 clause 7.2.1), additionally one set S (i.e., wideband) PMI value One MCSI value per codeword per subband (2 bits differential to the corresponding set S MCSI value)

In case of transmission modes 4, 8, 9, and 10: One RI value

It should be noted that the term subband is here used so as to represent a number of resource blocks as outlined earlier, while the term set S represents generally a subset of the whole set of resource blocks in the system bandwidth. In the context of 3GPP LTE and LTE-A, the set S so far is defined to always represent the whole cell, i.e., component carrier bandwidth, a frequency range of up to 20 MHz, and is for simplicity hereafter referred to as "wideband".

Aperiodic & Periodic CQI Reporting

The periodicity and frequency resolution to be used by a UE to report the CSI are both controlled by the eNodeB. The Physical Uplink Control Channel (PUCCH) is used for periodic CSI reporting only; the PUSCH is used for aperiodic reporting of the CSI, whereby the eNodeB specifically instructs the UE to send an individual CSI report embedded into a resource which is scheduled for uplink data transmission.

In order to acquire CSI information quickly, eNodeB can schedule aperiodic CSI by setting a CSI request bit in an uplink resource grant sent on the Physical Downlink Control Channel.

In 3GPP LTE, a simple mechanism is foreseen to trigger the so-called aperiodic channel quality feedback from the user equipment. An eNodeB in the radio access network sends an L1/L2 control signal to the user equipment to request the transmission of the so-called aperiodic CSI report (see 3GPP TS 36.212, section 5.3.3.1.1 and 3GPP TS 36.213, section 7.2.1 for details). Another possibility to trigger the provision of aperiodic channel quality feedback by the user equipments is linked to the random access procedure (see 3GPP TS 36.213, section 6.2).

Whenever a trigger for providing channel quality feedback is received by the user equipment, the user equipment subsequently transmits the channel quality feedback to the eNodeB. Commonly, the channel quality feedback (i.e., the CSI report) is multiplexed with uplink (user) data on the Physical Uplink Shared CHannel (PUSCH) resources that have been assigned to the user equipment by the L1/L2 signal (such as the PDCCH) which triggered the channel quality feedback.

Downlink Reference Signals

In the LTE downlink, five different types of RSs are provided:

Cell-specific RSs (often referred to as 'common' RSs, as they are available to all UEs in a cell and no UE-specific processing is applied to them);

UE-specific RSs (introduced in Release 8 and extended in release 9 and 10), which may be embedded in the data for specific UEs (also known as Demodulation Reference Signals—DM-RSs).

MBSFN-specific RSs, which are used only for Multimedia Broadcast Single Frequency Network (MBSFN) operation.

Positioning RSs, which from Release 9 onwards may be embedded in certain 'positioning subframes' for the purpose of UE location measurements.

Channel State Information, CSI, RSs, which are introduced in release 10 specifically for the purpose of estimating the downlink channel state and not for data demodulation.

Each RS pattern is transmitted from an antenna port at the eNodeB. An antenna port may in practice be implemented either as a single physical transmit antenna, or as a combination of multiple physical antenna elements. In either case, the signal transmitted from each antenna port is not designed to be further deconstructed by the UE receiver:

The transmitted RS corresponding to a given antenna port defines the antenna port from the point of view of the UE, and enables the UE to derive a channel estimate for all data transmitted on that antenna port—regardless of whether it represents a single radio channel from one physical antenna or a composited channel from a plurality of physical antenna elements together comprising the antenna port.

Cell-Specific Reference Signals

The cell specific RSs enable the UE to determine the phase reference for demodulating the downlink control channels and the downlink data in most transmission modes of the Physical Downlink Share Channel, PDSCH. If UE-specific pre-coding is applied to the PDSCH data symbols before transmission downlink control signaling is provided to inform the UE of the corresponding phase adjustment is should apply relative to the phase reference provided by the cell-specific reference signals.

In an OFDM-based system an equidistant arrangement of reference symbols in the lattice structure achieves the Minimum Mean-Squared Error (MMSE) estimate of the channel. Moreover, in the case of a uniform reference symbol grid, a 'diamonds shape' in the time-frequency plane can be shown to be optimal.

In LTE, the arrangement of REs on which the cell-specific RSs are transmitted follows these principles. FIG. 7 illustrates the RS arrangement where the cell-specific reference signals are indicated with P, namely, as {P0, P1, P2, P3}.

Up to four cell-specific antenna ports, numbered 0-3, may be used in LTE eNodeB, thus requiring the UE to derive up to four separate channel estimates. For each antenna port, a different RS pattern has been designed, with particular attention having been given to the minimization of intra-cell interference between the multiple transmit antenna ports.

In FIG. 7, Px indicates that the RE is used for the transmission of an RS on antenna port X. Then an RE is used to transmit an RS on one antenna port, the corresponding RE on the other antenna ports is set to zero to limit the interference.

Downlink Reference Signals for Estimation of Channel State Information (CSI-RS)

The main goal of CSI-RS is to obtain channel state feedback for up to eight transmit antenna ports to assist the eNodeB in its precoding operation. LTE release 10 supports transmission of CSI-RS for 1, 2, 4, and 8 transmit antenna ports. CSI-RS also enables the UE to estimate the CSI for multiple cells rather than just one serving cell, to support future multi-cell cooperative transmission schemes.

The following general design principles can be identified for CSI-RS:

In the frequency domain, uniform spacing of CSI-RS location is highly desirable:

In the time domain, it is desirable to minimize the number of subframes containing CSI-RS, so that a UE can estimate the CSI for different antenna ports and even different cells with minimum wake-up duty calycle when the UE is in Discontinuous Reception (DRX) mode, to preserve battery life.

The overall CSI-RS overhead involves a trade-off between accuracy CSI estimation for efficient operation and minimizing the impact on legacy pre-Release 10 UEs which are unaware of the presence of CSI-RS and whose data are punctured by the CSI-RS transmission.

CSI-RS of different antenna ports within a cell, and, as far as possible, form different cells, should be orthogonally multiplexed to enable accuracy CSI estimation.

Taking these considerations into account, the CSI-RS patterns selected for Release 10 are shown in FIG. 7. CDM codes of length 2 are used so the CSI-RS on two antenna ports share two REs on a given subcarrier.

The pattern shown in FIG. 7 can be used in both frame structure 1 (Frequency Division Duplex, FDD), and frame structure 2 (Time Division Duplex, TDD). The REs used for CSI-RSs are labeled RS and used together with the following table grouping the CSI-RS into CSI reference signal configuration.

In addition the following table includes for each CSI reference signal configuration an identification of the cell index as one of the set of {A, B, C, D, E, F, G, H, I, J, K, L, V, N, O, P, Q, R, S, T} or a subset thereof and the antenna port and the maximum 8 antenna ports grouped into CDM groups {x, z, y, u}.

Layer 1/Layer 2 (L1/L2) Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe.

It should be noted that user allocation might also be performed on a TTI (Transmission Time Interval) basis, where the TTI length can be a multiple of the subframes. The TTI length may be fixed in a service area for all users, may be different for different users, or may even be dynamic for

TABLE 1

| | | | Number of CSI reference signals configured | | | | | | |
|---|---|---|---|---|---|---|---|---|---|
| | | 1 or 2 | | | 4 | | | 8 | |
| | CSI reference signal configuration | (k', l') | $n_s$ mod 2 | Cell index, CDM group | (k', l') | $n_s$ mod 2 | Cell index, CDM group | (k', l') | $n_s$ mod 2 | Cell index, CDM group |
| Frame structure type 1 and 2 | 0 | (9, 5) | 0 | Ax | (9, 5) | 0 | Ax | (9, 5) | 0 | Ax |
| | 1 | (11, 2) | 1 | Bx | (11, 2) | 1 | Bx | (11, 2) | 1 | Bx |
| | 2 | (9, 2) | 1 | Cx | (9, 2) | 1 | Cx | (9, 2) | 1 | Cx |
| | 3 | (7, 2) | 1 | Dx | (7, 2) | 1 | Dx | (7, 2) | 1 | Dx |
| | 4 | (9, 5) | 1 | Ex | (9, 5) | 1 | Ex | (9, 5) | 1 | Ex |
| | 5 | (8, 5) | 0 | Fx | (8, 5) | 0 | Fx | | | (Az) |
| | 6 | (10, 2) | 1 | Gx | (10, 2) | 1 | Gx | | | (Bz) |
| | 7 | (8, 2) | 1 | Hx | (8, 2) | 1 | Hx | | | (Cz) |
| | 8 | (6, 2) | 1 | Ix | (6, 2) | 1 | Ix | | | (Dz) |
| | 9 | (8, 5) | 1 | Jx | (8, 5) | 1 | Jx | | | (Ez) |
| | 10 | (3, 5) | 0 | Kx | | | (Ay) | | | (Ay) |
| | 11 | (2, 5) | 0 | Lx | | | (Fy) | | | (Au) |
| | 12 | (5, 2) | 1 | Vx | | | (By) | | | (By) |
| | 13 | (4, 2) | 1 | Hx | | | (Gy) | | | (Bu) |
| | 14 | (3, 2) | 1 | Ox | | | (Cy) | | | (Cy) |
| | 15 | (2, 2) | 1 | Px | | | (Hy) | | | (Cu) |
| | 16 | (1, 2) | 1 | Qx | | | (Dy) | | | (Dy) |
| | 17 | (0, 2) | 1 | Rx | | | (Iy) | | | (Du) |
| | 18 | (3, 5) | 1 | Sx | | | (Ey) | | | (Ey) |
| | 19 | (2, 5) | 1 | Tx | | | (Jy) | | | (Eu) |
| Frame structure type 2 only | 20 | (11, 1) | 1 | Ax | (11, 1) | 1 | Ax | (11, 1) | 1 | Ax |
| | 21 | (9, 1) | 1 | Bx | (9, 1) | 1 | Bx | (9, 1) | 1 | Bx |
| | 22 | (7, 1) | 1 | Cx | (7, 1) | 1 | Cx | (7, 1) | 1 | Cx |
| | 23 | (10, 1) | 1 | Dx | (10, 1) | 1 | Dx | | | (Az) |
| | 24 | (8, 1) | 1 | Ex | (8, 1) | 1 | Ex | | | (Bz) |
| | 25 | (6, 1) | 1 | Fx | (6, 1) | 1 | Fx | | | (Cz) |
| | 26 | (5, 1) | 1 | Gx | | | (Ay) | | | (Ay) |
| | 27 | (4, 1) | 1 | Hx | | | (Dy) | | | (Au) |
| | 28 | (3, 1) | 1 | Ix | | | (By) | | | (By) |
| | 29 | (2, 1) | 1 | Jx | | | (Ey) | | | (Bu) |
| | 30 | (1, 1) | 1 | Kx | | | (Cy) | | | (Cy) |
| | 31 | (0, 1) | 1 | Lx | | | (Fy) | | | (Cu) |

The table corresponds to that included 3GPP TS 36.211 V12.3.0 under section 6.10.5.2 in Table 6.10.5.2-1: illustrating a mapping from CSI reference signal configuration to (k', l') for normal cyclic prefix, additionally including the identification of Cell index, CDM group.

In addition, Cell index and CDM group entries in brackets are meant to indicate which index/group combination corresponds to which RE location (k', l') within the time/frequency grids of a resource block; but it is not intended to indicate that a corresponding CSI reference signal configuration index is supported, rather the dependency follows implicitly from other parts of 3GPP TS 36.211 V12.3.0. Consequently, those entries in brackets should be understood just for illustrational purposes.

each user. Generally, the L1/2 control signaling need only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e., conveys L1/L2 control signaling, even though the detailed transmission methods are different from the PDCCH.

Further details can be found particularly in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;
Resource allocation information, indicating the resources (Resource Blocks, RBs) on which a user is allocated. Alternatively this information is termed resource block assignment (RBA). Note that the number of RBs on which a user is allocated can be dynamic;
Carrier indicator, which is used if a control channel transmitted on a first carrier assigns resources that concern a second carrier, i.e., resources on a second carrier or resources related to a second carrier; (cross carrier scheduling);
Modulation and coding scheme that determines the employed modulation scheme and coding rate;
HARQ information, such as a new data indicator (NDI) and/or a redundancy version (RV) that is particularly useful in retransmissions of data packets or parts thereof;
Power control commands to adjust the transmit power of the assigned uplink data or control information transmission;
Reference signal information such as the applied cyclic shift and/or orthogonal cover code index, which are to be employed for transmission or reception of reference signals related to the assignment;
Uplink or downlink assignment index that is used to identify an order of assignments, which is particularly useful in TDD systems;
Hopping information, e.g., an indication whether and how to apply resource hopping in order to increase the frequency diversity;
CSI request, which is used to trigger the transmission of channel state information in an assigned resource; and
Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields. The different DCI formats that are currently defined for LTE are as follows and described in detail in 3GPP TS 36.212, "Multiplexing and channel coding", section 5.3.3.1 (current version v12.2.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2, and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Formats 3 and 3A: DCI formats 3 and 3A are used for the transmission of power control commands for PUCCH and PUSCH with 2-bit or 1-bit power adjustments, respectively. These DCI formats contain individual power control commands for a group of UEs.

Format 4: DCI format 4 is used for the scheduling of the PUSCH, using closed-loop spatial multiplexing transmissions in uplink transmission mode 2. Transmission Modes for the PDSCH (Physical Downlink Shared Channel)

The Physical Downlink Shared CHannel (PDSCH) is the main data bearing downlink channel in LTE. It is used for all user data, as well as for broadcast system information which is not carried on the PBCH, and for paging messages—there is no specific physical layer paging channel in LTE. Data is transmitted on the PDSCH in units known as Transport Blocks (TBs), each of which corresponds to a Medium Access Control (MAC) layer protocol data unit (PDU). Transport blocks may be passed down from the MAC layer to the physical layer once per Transmission Time Interval (TTI), where a TTI is one ms, corresponding to the subframe duration.

When employed for user data, one or, at most, two transport blocks can be transmitted per UE per subframe per component carrier, depending on the transmission mode selected for the PDSCH for each UE. In LTE, usually there are multiple antennas for downlink, i.e., the eNodeB may use multiple transmit antennas, and the UE may use multiple receiving antennas. The two antennas can be used in diverse configurations, which are distinguished and denoted as transmission modes in LTE. The UE is configured by the eNodeB with a particular transmission mode. For instance, the single transmission antenna in single receiver antenna mode is called transmission mode 1.

The various transmission modes are defined in the 3GPP technical standard TS 36.213 (current version 12.3.0), sub-clause 8.0 for the uplink (particularly Tables 8-3, 8-3A, 8-5, and 8-5A) and subclause 7.1 for the downlink (particularly Tables 7.1-1, 7.1-2, 7.1-3, 7.1-5, 7.1-5A, 7.1-6, 7.1-6A, and 7.1-7); these are incorporated herein by reference. These tables from 3GPP TS 36.213 show the relationship between RNTI Type (e.g., C-RNTI, SPS C-RNTI, SI-RNTI), the Transmission Mode and the DCI format.

These tables provide several predefined transmission modes identifying the particular transmission scheme to be used for the PDSCH corresponding to the (E)PDCCH.

LTE on Unlicensed Bands—Licensed-Assisted Access LAA

In September 2014, 3GPP initiated a new study item on LTE operation on unlicensed spectrum. The reason for extending LTE to unlicensed bands is the ever-growing demand for wireless broadband data in conjunction with the limited amount of licensed bands. Unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation on unlicensed bands will therefore at least in the beginning be considered rather a complement to LTE on licensed spectrum than stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The current intended general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

A very basic scenario is illustrated in FIG. 8, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB, or could be nodes that are attached to the network but not managed by the eNB. For simplicity, the connection of these nodes to the eNB or to the network is not explicitly shown in the figure.

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as, for example, voice and video, while a PCell on unlicensed spectrum might yield, depending on the scenario, to some extent significant QoS reduction due to inevitable coexistence with other RATs.

It has been agreed during RAN1 #78bis, that the LAA investigation at 3GPP will focus on unlicensed bands at 5 GHz, although no final decision is taken. One of the most critical issues is therefore the coexistence with Wi-Fi (IEEE 802.11) systems operating at these unlicensed bands. In order to support fair coexistence between LTE and other technologies such as Wi-Fi as well as fairness between different LTE operators in the same unlicensed band, the channel access of LTE for unlicensed bands has to abide by certain sets of regulatory rules which depend on region and considered frequency band.

A comprehensive description of the regulatory requirements for operation on unlicensed bands at 5 GHz is given in R1-144348, "Regulatory Requirements for Unlicensed Spectrum" (R1-144348, "Regulatory Requirements for Unlicensed Spectrum"), Alcatel-Lucent et al., RAN1 #78bis, September 2014, incorporated herein by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of the 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, that is associated with the master, to implement the radar detection.

The operation on unlicensed bands at 5 GHz is in most regions limited to rather low transmit power levels compared to the operation on licensed bands resulting in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

Considering the different regulatory requirements, it is apparent that the LTE specification for operation on unlicensed bands will require several changes compared to the current Rel-12 specification that is limited to licensed band operation.

In connection with the new work item Licensed-Assisted Access it is also not finally decided how the mobile station is reporting channel state information, CSI to a base station, particularly in a scenario in which a plurality of, namely, unlicensed and licensed, component carriers are configured for communication between the mobile station and the base station for at least one of downlink and uplink transmissions. A reliable and efficient CSI reporting mechanism should be implemented taking into account the special circumstances of unlicensed carriers.

SUMMARY

One non-limiting and exemplary embodiment provides an improved method for reporting channel state information, CSI, in a mobile communication station, an improved user equipment for reporting the channel station information, CSI, to a base station in the mobile communication system, and a computer readable medium for carrying out the improved method for reporting the CSI in the mobile communication system.

In one general aspect, the techniques disclosed here a method for reporting channel state information, CSI, from a mobile station to a base station in a mobile communication system in which a plurality of downlink component carriers and at least one uplink component carrier are configured for communication between the base station and the mobile station. In this respect, the mobile station receives from the base station a trigger message that triggers the reporting of channel state information for at least one of the plurality of downlink component carriers, the trigger message being received in a subframe $n_{Trigger}$. Then, the mobile station reports to the base station, the triggered channel state information for the at least one of the plurality of downlink component carriers based on reference signals, RS, present on the at least one of the plurality of downlink component carriers, in a subframe $n_{Report}$ later than $n_{Trigger}$. The received trigger message indicates that the reference signals, RS, on the basis of which the channel state information is to be reported, are present in a subframe $n_{RS}$ on the at least one of the plurality of downlink component carriers, where $n_{Trigger} \leq n_{RS} < n_{Report}$.

According to another aspect, a mobile station is provided for reporting channel state information (CSI) to a base station in a mobile communication system in which a plurality of downlink component carriers and at least one uplink component carrier are configured for communication between the base station and the mobile station. The mobile station includes a receiver, which, in operation, receives from the base station a trigger message that triggers the reporting of CSI for at least one of the plurality of downlink component carriers, wherein the trigger message is received in a subframe nTrigger. The mobile station includes a transmitter, which, in operation, transmits to the base station, the triggered CSI for the at least one of the plurality of downlink component carriers based on reference signals present on the at least one of the plurality of downlink component carriers, in a subframe nReport later than nTrigger. The reference signals, on the basis of which the CSI is to be reported, are present in a subframe nRS on the at least one of the plurality of downlink component carriers, where nRS is indicated by means of higher layer signaling. The triggered CSI may include: a wideband channel quality indicator (CQI) value per codeword, which is calculated assuming use of a single precoding matrix in all sub-bands and downlink transmission on a set of sub-bands (S); and a selected single precoding matrix indicator (PMI), or a first and second PMI corresponding to the selected single PMI. The single PMI may be selected from a codebook subset assuming downlink transmission on the set of sub-bands (S). The reported PMI and the reported CQI values may be calculated conditioned on a reported rank indicator (RI) or may be calculated conditioned on RI=1.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 shows a first variant of a mapping of CRS and CSI-RS onto a PRB for use with 8 CSI-RS ports in connection with the improved channel state information reporting mechanism according to another embodiment;

FIG. 12 shows a second variant of a mapping of CRS and CSI-RS onto a PRB for use with 2 CSI-RS ports in connection with the improved channel state information reporting mechanism according to a further embodiment;

FIG. 13 shows a third variant of a mapping of CRS and CSI-RS onto a PRB, wherein FIG. 13 is for 2 CSI-RS ports according to yet another embodiment;

FIG. 14 shows a third variant of a mapping of CRS and CSI-RS onto a PRB, wherein FIG. 14 is for 2 CSI-RS ports according to yet another embodiment;

FIG. 15 shows a third variant of a mapping of CRS and CSI-RS onto a PRB, wherein FIG. 15 is for 4 CSI-RS ports according to yet another embodiment;

FIG. 16 shows a third variant of a mapping of CRS and CSI-RS onto a PRB, wherein FIG. 16 is for 4 CSI-RS ports according to yet another embodiment;

FIG. 17 shows a third variant of a mapping of CRS and CSI-RS onto a PRB, wherein FIG. 17 is for 8 CSI-RS ports according to yet another embodiment;

FIG. 18 shows a fourth variant of a mapping of CRS and CSI-RS onto a PRB for use with 8 CSI-RS ports in connection with the improved channel state information reporting mechanism according to an even further embodiment.

DETAILED DESCRIPTION

Figure 1:
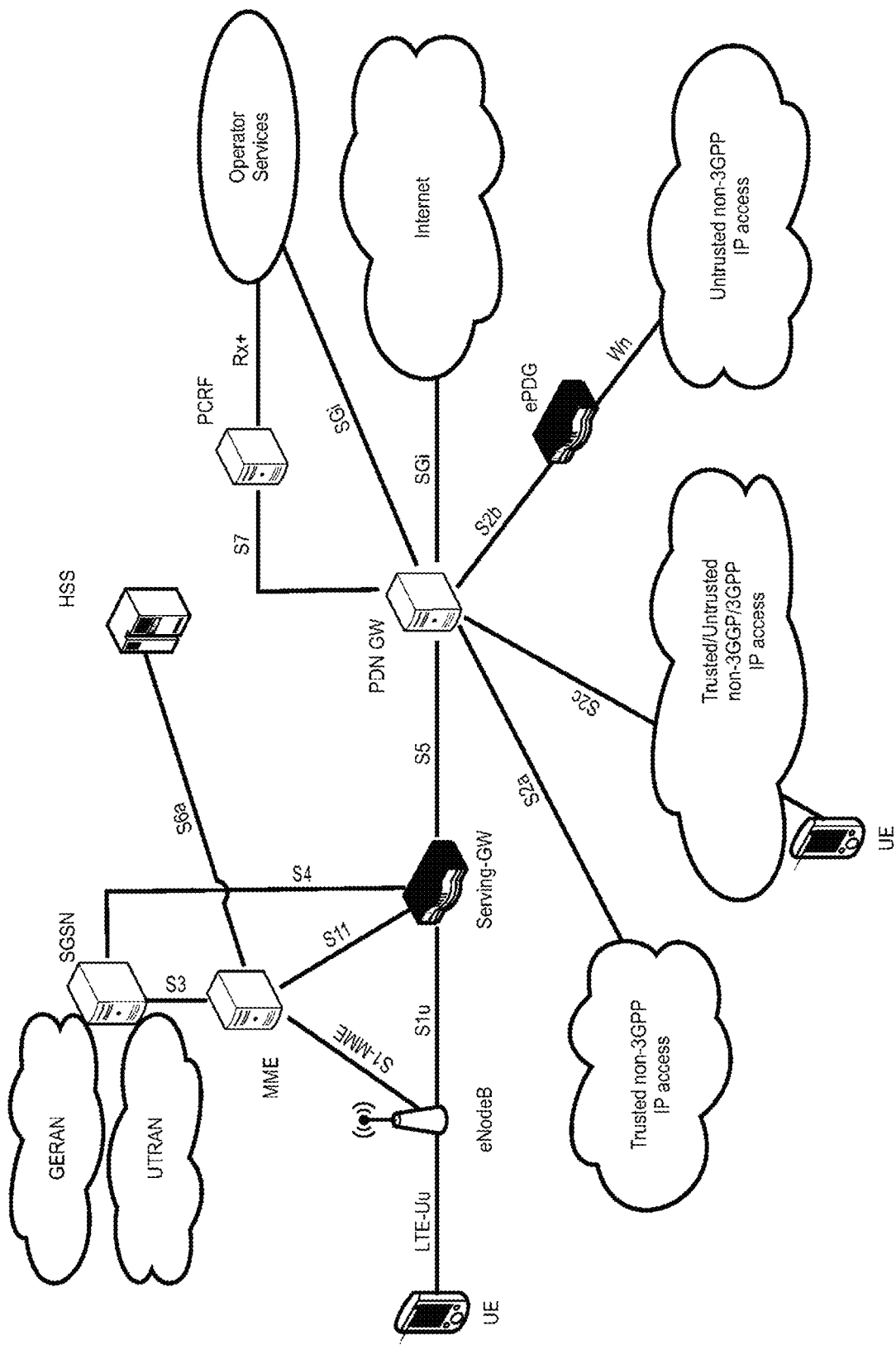
FIG. 1 shows an exemplary architecture of a 3GPP LTE system.
Figure 2:
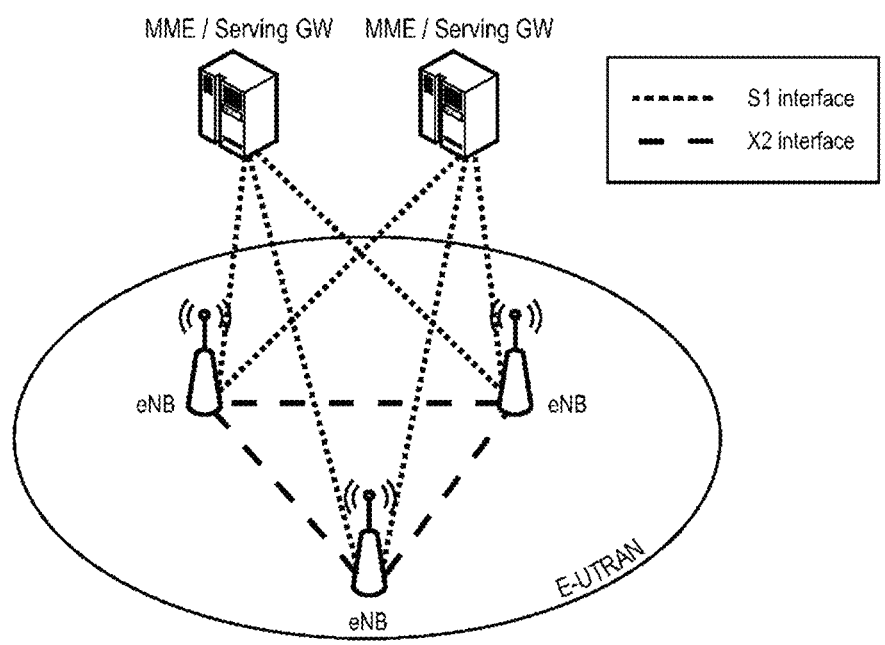
FIG. 2 shows an exemplary overview of the overall E-UTRAN architecture of 3GPP LTE.
Figure 3:
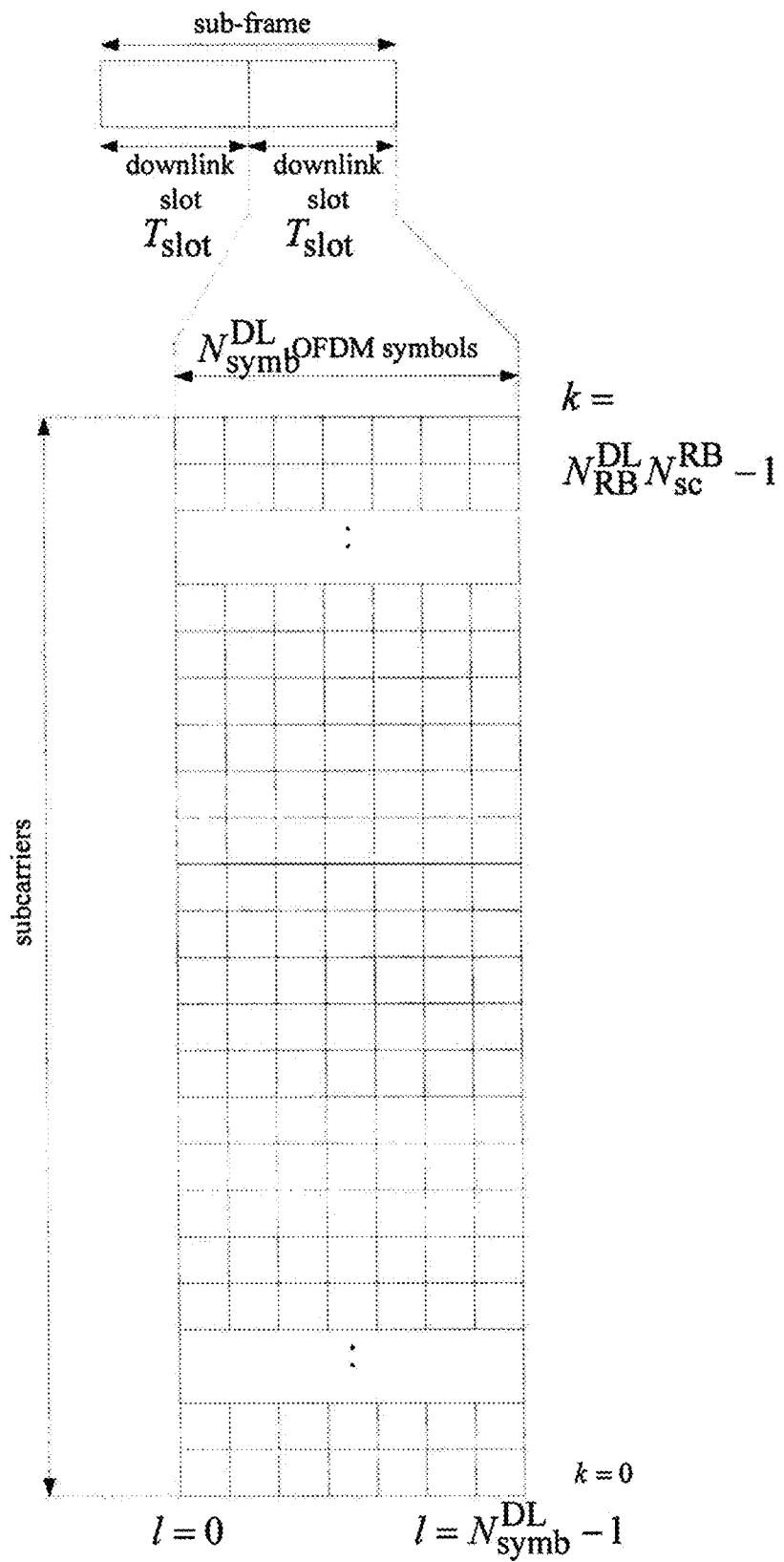
FIG. 3 shows exemplary subframe boundaries on a downlink component carrier as defined for 3GPP LTE (Release 8/9)
Figure 4:
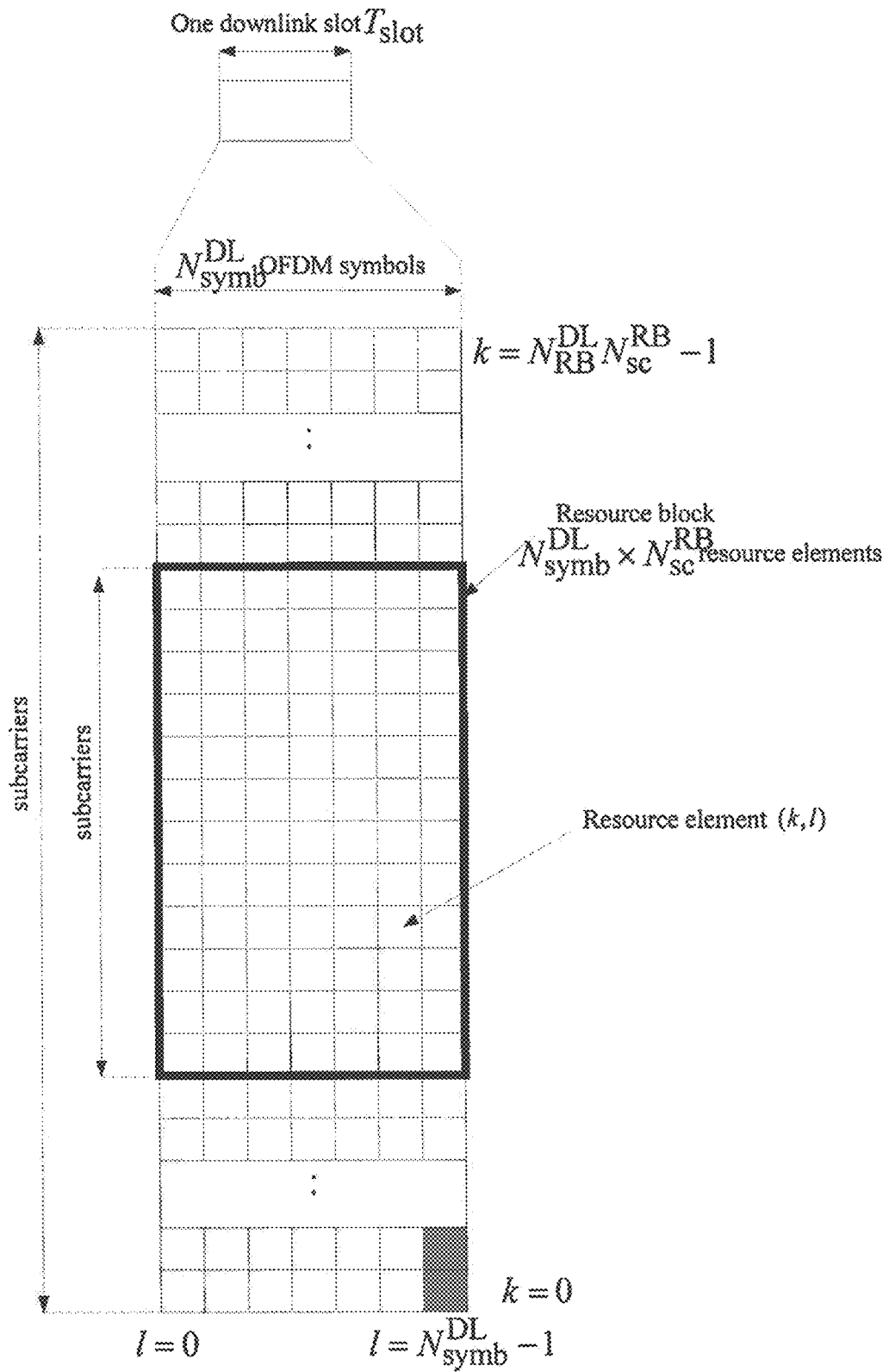
FIG. 4 shows an exemplary downlink resource grid of a downlink slot as defined for 3GPP LTE (Release 8/9)
Figure 5:
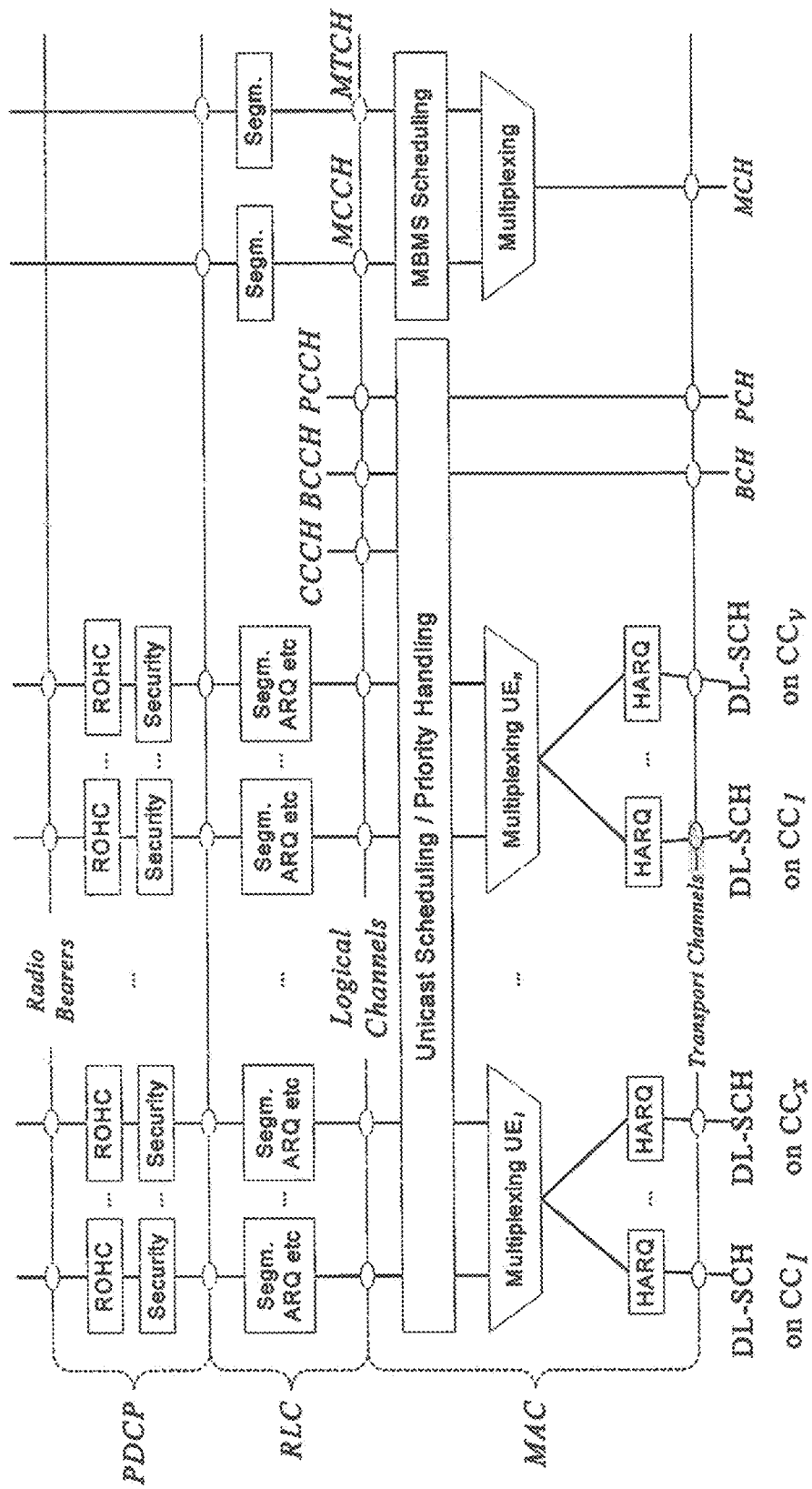
FIG. 5 shows the 3GPP LTE-A (Release 10) Layer 2 structure with activated carrier aggregation for the downlink.
Figure 6:
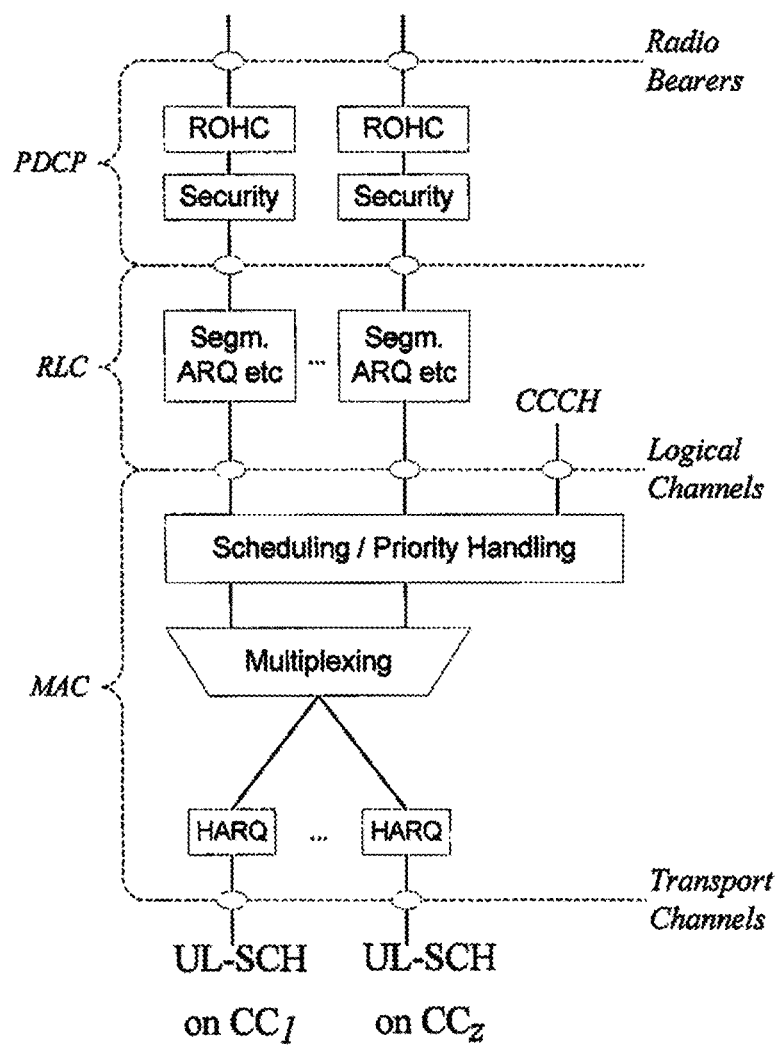
FIG. 6 shows the 3GPP LTE-A (Release 10) Layer 2 structure with activated carrier aggregation for the uplink.

It should be noted that the embodiments may be advantageously used, for example, in a mobile communication system such as 3GPP LTE-A (Release 10/11/12) communication systems as described in the Technical Background section above, but the embodiments are not limited to its use in this particular exemplary communication networks.

A mobile station or mobile node or user terminal or user equipment is a physical entity within a communication network. One node may have several functional entities. A functional entity refers to a software or hardware module that implements and/or offers a predetermined set of functions to other functional entities of a node or the network Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "radio resources" as used herein has to be broadly understood as referring to physical radio resources, such as time-frequency resources.

The term "unlicensed carrier", and conversely "licensed carrier" are to be understood in connection with the new LTE work item licensed-assisted access (LAA). Correspondingly, "licensed carriers" is the term for the situation where a carrier is licensed for exclusive use to an operator, usually by a regulatory body that has authority over the radio frequency usage for a defined geographical region. "Unlicensed carriers" would be the term used for carrier(s) which cover(s) frequencies which are at the moment not licensed for LTE, and are in particular open for any usage that complies with certain regulations, or are otherwise shared non-exclusively. As described in the background section there are several differences between licensed carriers and unlicensed carriers, as regards, e.g., reliability, power level and QoS.

The term "higher layer signaling" as used herein has to be understood broadly referring to layers above the PHY layer (according to the OSI model), comprising the MAC layer (e.g., MAC CE), RRC layer, and further layers above, and their corresponding signals and messages.

The term "wideband" in the narrow sense can be understood as spanning the system bandwidth of, for example, a component carrier. Nevertheless, the term "wideband" as used herein shall not be construed as only referring to configuration where the system bandwidth is covered in its entirety, namely, of a set of contiguous subbands making up the entire system bandwidth; rather, the term "wideband" shall also be understood as representing a set of adjacent and/or distributed physical resources (such as subbands, resource blocks, or subcarriers).

As explained in the background section, for unlicensed carriers it is not finally decided how channel state information, CSI, reporting by the mobile station is implemented, i.e., how the reporting is carried out in a mobile communication system in which a plurality of downlink (component) carriers and at least one uplink (component) carrier are configured for communication between the base station and the mobile station, where at least one component carrier is available for downlink transmission. It should be noted that even though in a time domain duplexing scheme a single frequency carrier is used for uplink and downlink (though not simultaneously), for simplicity of the description, this case should also be understood as having one component carrier for uplink and having one component carrier for downlink.

Specifically, in the background section it has been established that present implementations of channel state information, CSI, reporting are mechanisms that are inadequate considering the regulatory requirements that have to be taken into account when designing LAA procedures. For operation on unlicensed bands, changes are necessary, particularly to the current CSI reporting implementation.

When operating an unlicensed carrier as downlink (component) carrier, the presence of continuous, non-interfered reference signals, RS, namely, cell specific reference signals CRS and/or channel state information—reference signals CSI-RS, can no longer be ensured. The unlicensed carrier access is limited to, for instance, at most 10 ms continuous usage in Europe.

Further, the unlicensed carrier is supposed to be shared between various operators and/or radio access technologies, including, for instance, WIFI. However, coexistence with WIFI nodes on an unlicensed carrier is difficult as a WIFI node would occupy the unlicensed carrier in its entirety, assuming full 20 MHz (or even a plurality of 20 MHz carriers) for active transmissions.

Unlicensed carrier access is generally targeting burst transmissions, i.e., a scenario where the unlicensed carrier is occupied for a short period of time for a bursty downlink transmission between a base station and a mobile station. However, even in this case, the channel state information, and hence the reporting thereof, is crucial for an efficient adaptation to the channel.

The CSI reporting mechanism relies on the presence of reference signals on which the CSI reporting is based. A reference signal is a signal which is known to the receiver, and which is inserted into a transmitted signal at defined positions in order to facilitate channel estimation for coherent demodulation and measurements.

In the LTE downlink, cell-specific RSs are provided which are available to all UEs in a cell; UE-specific RSs may be embedded in the data for specific UEs for purposes of estimating the channel for data demodulation, but not for channel state information reports. In LTE Release 10 support for the transmission of channel state information reference signals CSI-RS was introduced, with the main goal of obtaining channel state feedback for up to eight transmit antenna ports to assist the base station in the precoding operations, and potentially different resources for measuring the signal strength and the noise+interference strength. The configuration of CSI-RS is established by RRC signaling.

Presently, the CSI reporting allows configuration of periodic as well as aperiodic CSI reporting schemes. The CSI reporting is configured by an RRC message for a (i.e., downlink) component carrier. The configuration assumes that the component carrier includes the reference signals on the basis of which the CSI reporting is effected. In this respect, CSI reporting can in theory be configured for licensed and unlicensed carriers.

For periodic CSI reporting, the configuration by RRC is sufficient to determine and initiate the periodic CSI report transmissions. An aperiodic CSI reporting needs to be triggered on PHY layer, for example, by use of a DCI format 0 message specifying in the "CSI request field" that the transmission of a CSI report is requested. In other words, a message indicating that a CSI report is requested, may trigger at a mobile station the transmission of an aperiodic CSI report.

In this respect, in the direct comparison between the periodic and the aperiodic CSI reporting, the aperiodic CSI reporting appears better suited for utilization in connection with unlicensed carriers. Moreover, the transmission of an aperiodic CSI report can be triggered by a base station which, thereby, can ensure that the regulatory requirements are satisfied.

Nevertheless, even the aperiodic CSI reporting scheme has disadvantages when configured for an unlicensed carrier, namely, for the following reasons:

The aperiodic CSI reports equally rely on periodic CSI-RS transmissions on the unlicensed carrier. The configuration of CSI-RS presently assumes a same re-occurring mapping to resource elements on a downlink component carrier, and the configuration is facilitated exclusively by RRC message(s). The aperiodic CSI reports presently combine wideband and frequency-selective feedback. However, the frequency-selective feedback is conceptually unsuitable for a shared radio resource, e.g., due to inaccuracies, provided on the unlicensed carrier and only results in unnecessary signaling overhead.

The aperiodic CSI report may be based on preceding CRS or CSI-RS which no longer reflects the channel conditions, in particular for LTE-U burst scenario, where a considerable time-span may elapse between the transmission of a periodic CSI-RS and the subsequent report instance, leading to inaccuracies due to fluctuations of the channel conditions due to, e.g., fading or mobility effects.

The following exemplary embodiments are conceived by the inventors to mitigate the problems explained and to provide a reliable and efficient CSI reporting mechanism, particularly for unlicensed carriers (although it is equally applicable to licensed carriers) that are at least partially used for downlink communication.

In the following, several exemplary embodiments will be explained in detail. Some of these are supposed to be implemented in the specification as given by the 3GPP standards and explained partly in the present background section, with the particular key features as explained in the following pertaining to the various embodiments.

It should be noted that the embodiments may be advantageously used, for example, in a mobile communication system such as 3GPP LTE-A (Release 10/11/12) communication systems as described in the Technical Background section above, but the embodiments are not limited to its use in this particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure as such.

In the following a set of embodiments will be explained. To simplify the illustration of the underlying principles, several assumptions are made; however, it should be noted that these assumptions should not be interpreted as limiting the scope of the present application, as broadly defined by the claims.

Figure 9:
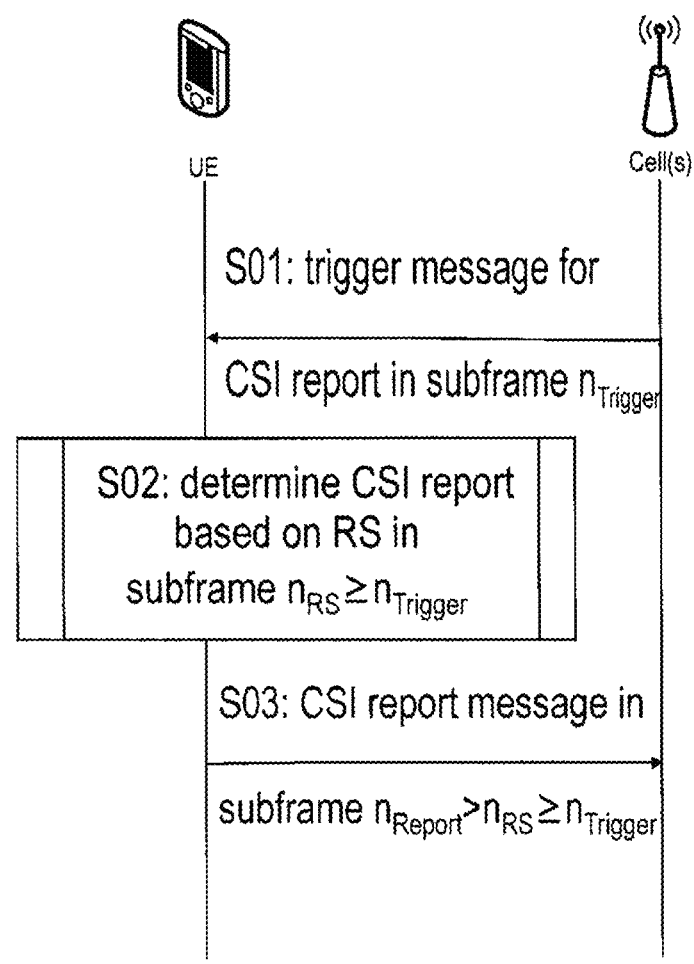
FIG. 9 shows a sequence diagram of the improved channel state information reporting mechanism according to one embodiment.

According to a first embodiment illustrated in FIG. 9 the improved channel state information, CSI, reporting mechanism is provided for reporting CSI by a mobile station to a base station. For the great part of the following description of this first embodiment, it is assumed that the CSI reporting is performed for an unlicensed carrier. However, the improved CSI reporting mechanism is equally applicable for reporting CSI of a licensed carrier.

It is of fundamental importance to distinguish a "CSI report for a carrier" from a "CSI report on a carrier"; the former denotes the carrier for which the channel state is reported, while the latter denotes the carrier on which the channel state information (i.e., the feedback message) is transmitted. Therefore, the former refers to a downlink carrier (or the time-span when a carrier is usable for downlink), while the latter refers to an uplink carrier (or the time-span when a carrier is usable for uplink).

The improved CSI reporting mechanism is preferably carried out in a mobile communication system in which a plurality of downlink component carriers and at least one uplink component carrier are configured between the base station and the mobile station, even though it can also be carried out where only one downlink and one uplink carrier are configured. Referring to the terminology of LTE Release 10, the component carriers may equally be referred to as serving cells.

In such a mobile communication system, the mobile station receives (step S01—FIG. 9) from the base station a trigger message that triggers reporting of channel state information, CSI. By this trigger message, a CSI report is triggered for one or plural of the configured downlink component carriers. For the following, it shall be assumed that the mobile station receives the trigger message in a subframe with index $n_{Trigger}$.

Notably, the one or plural downlink component carriers, for which the CSI report is triggered, is not necessarily the same downlink component carrier on which the trigger message is received. Rather, in one exemplary scenario the trigger message may be received on a downlink component carrier corresponding to a licensed carrier and the CSI report may be triggered for one or plural downlink component carriers corresponding to unlicensed carriers.

In an exemplary implementation, the trigger message is in form of a downlink control information, DCI, format, wherein a CSI request field indicates that CSI is to be reported by the mobile station. For example, a CSI request field is specified in the DCI format 0 and in the DCI format 4. In this respect, the triggered channel state information, CSI, is reported aperiodically by the mobile station, namely, as aperiodic CSI report. Aperiodic CSI reporting formats are defined in LTE release 10 as PUSCH CSI reporting modes.

In response to the received trigger message, the mobile station determines (step S02—FIG. 9) for the one or plural downlink component carriers a CSI report based on reference signals present on this downlink component carrier(s). In other words, the trigger message references (or indicates) the one or plural downlink component carriers on the basis of which the CSI report is to be established.

The CSI report is based on the indicated reference signals, RS, present on the at least one of the downlink component carriers. In other words, the mobile station evaluates the indicated reference signals with which it is configured and based thereon reports the triggered CSI to the base station. The RSs used for this purpose are preferably CRS or CSI-RS.

In another exemplary implementation, for the CSI reporting the mobile station evaluates reference signals of contiguous or distributed physical resource blocks, PRBs, in the set of sub-bands, S, on the at least one of the plurality of downlink component carriers for which the CSI is to be reported. The set of sub-bands S is a system parameter with which the mobile station is pre-configured.

Even though LTE specifications use the term "sub-band" as a plurality of physical resource blocks, the usage here should be construed as not being restricted to such a definition. Rather, a sub-band as described herein can also be an individual physical resource block, or even a part of a physical resource block such as one or a plurality of sub-carriers.

In this respect, as the set S may only refer some of the resource blocks of the cell, it is necessary to pay attention to interpreting the term wideband (or set S) used in connection with the embodiments broader than only "wideband" (or "set S") as such. For example, "wideband" shall not be construed to mean exclusively the whole system bandwidth, but rather the plurality of resource blocks contained in set S, which may be furthermore be non-adjacent in the frequency domain.

Commonly, the set of sub-bands S is configured such that it spans the (e.g., entire) downlink system bandwidth of the one or plural component carriers. In this respect, in this exemplary implementation, the CSI is reported as a wideband CSI report for the set of sub-bands S spanning the (e.g., entire) downlink system bandwidth of the one.

In any case, the configured set of sub-bands S, for which the wideband CSI is reported in this exemplary implementation, differs from a frequency selective CSI report which may be configured in addition or alternative to the wideband CSI report. Moreover, a selective reporting of CSI for specific subbands contradicts the approach of reporting wideband CSI for the (e.g., entire) downlink system bandwidth of the one or plural component carriers.

Further, in response to the receipt of the trigger message the mobile station reports (step S03—FIG. 9) the triggered channel state information, CSI, report for the one or plural downlink component carriers. For the following, it shall be assumed that the mobile station transmits the CSI report in a subframe with index $n_{Report}$ later than $n_{Trigger}$.

Further to the exemplary implementation, the trigger message in the DCI format carries an uplink resource assignment. Accordingly, the uplink resource in which the CSI report shall be transmitted is determined by the L1/L2 control signal carried in the trigger message. In a more specific example, the trigger message is in DCI format 0 or DCI format 4.

Due to the determined uplink resource in the trigger message, the CSI reported on the uplink resource may not be based on reference signals which are more recent than the CSI report. In other words, the reference signals must have been received prior to the subframe $n_{Report}$ in which the CSI report is to be transmitted. Accordingly, the subframe $n_{Report}$ may be understood as an upper/latest limit to the subframe where the RSs serving as the reference for the triggered CSI report are transmitted.

In another exemplary implementation, which can be combined with the above, the CSI report is reported on the physical uplink shared channel, PUSCH, on the at least one uplink component carrier. In particular, a pre-configured CSI reporting mode is used for conveying the CSI report to the base station.

As already described before, the reference signals on which the CSI report is based are transmitted in the one or plural downlink component carriers for which the mobile station reports the CSI. Specifically, the one or plural downlink component carriers on which the reference signals are present may be different from the downlink component carrier on which the trigger message is transmitted/received.

Advantageously, the trigger message indicates a subframe with index $n_{RS}$ on which the reference signals, RS, are present. The reference signals are present on the one or plural downlink component carriers based on which the CSI is to be reported.

In this respect, the trigger message does not leave open on the basis on which reference signals the CSI is to be reported. The indicated subframe with index $n_{RS}$ is sometimes also termed "reference resource" referencing the resources for the CSI report.

In a more detailed implementation, the mobile station is adapted to interpret the received trigger message for triggering a CSI report such that it indicates a singular occasion for reference signals, RS, to be present in the subframe $n_{RS}$ on the one or plural downlink component carriers for which the CSI report is triggered (i.e., requested). In other words, the mobile station is adapted to utilize the received trigger message for one-shot CSI reporting only.

Exemplarily, the mobile station is adapted to interpret the received trigger message for triggering a CSI report such that it indicates singular occasions of reference signals, RS, are offset by a predefined or signalled subframe number 11 with respect to the trigger message in $n_{Trigger}$. In this respect, the received trigger message indicates that the singular occasions of reference signals are present in subframe with index: $n_{RS}=n_{Trigger}+I_1$, on the one or plural downlink component carriers for which the CSI report is triggered.

Alternatively, the mobile station is exemplarily adapted to interpret the received trigger message for triggering a CSI report such that it indicates plural occasions of reference signals, RS; which are offset by a predefined or signalled subframe number 11 with respect to the trigger message in $n_{Trigger}$ and are spaced at a further predefined or signalled subframe number $I_2$.

In this respect, the received trigger message indicates that the plural occasions of reference signals are present in subframes with index: $n_{RS}=n_{Trigger}+I_1$, $n_{Trigger}+I_1+I_2$, $n_{Trigger}+I_1+2*I_2$, ... on the one or plural downlink component carriers for which the CSI report is triggered. In other words, the mobile station is adapted to utilize the received trigger message for plural CSI reports each for a respective one of the plural reference signals in the indicated subframes $n_{RS}$.

Specifically, the indication of subframe with index $n_{RS}$ is advantageous for the CSI reporting of unlicensed carriers. In view of the indication of one or plural specific subframe(s) $n_{RS}$ that the CSI report is to be based on, the base station can reduce the number of subframes which have to be evaluated by the mobile station for the CSI reporting, and can at the same time ensure that only the reference signals of a relevant subframe, namely, of the subframe with index $n_{RS}$, are evaluated for the CSI reporting.

For best adaptation to the shared nature of an unlicensed carrier, it is advantageous to indicate $n_{RS}$ in the DCI message triggering the report. However, since this may require an undesirable overhead, another solution is to indicate it by means of higher layer signalling such as RRC messages, preferably within the same message that configures other CSI report or CSI-RS parameters.

Nevertheless, it shall be emphasized that the trigger message (or as just mentioned, a higher layer configuration) not necessarily include a field for directly indicating the subframe on which the reference signals, RS, are present. Instead the trigger message may also indirectly reference a subframe based on a prescribed offset between $n_{RS}$ and $n_{Trigger}$ or between $n_{RS}$ and $n_{Report}$, i.e., relative to the subframe with index $n_{RS}$ or $n_{Trigger}$.

According to an exemplary implementation, a predefined CSI reporting mode may foresee that the CSI report for one or plural downlink component carriers is based on reference signals which are present in the same subframe as the trigger message but not necessarily on the same downlink component carrier of the trigger message.

In any case, the received trigger message indicates that the reference signals, RS, for the CSI report, are in subframe with index $n_{RS}$, where $n_{Trigger} \leq n_{RS} < n_{Report}$. Thereby, not only the amount of buffering for reference signals reduces but also it can be ensured that CSI is reported only on the basis of reference signals, RS, from most recent subframes.

This keeps the influence of fading effects on the reposted CSI small, so that inaccuracies between the channel state at the time of measurement and at the time of reporting can be largely avoided; even more so in case only a single CQI value is reported for the set S instead of a CQI value per element (e.g., subband) within the set S. In other words, as result of the restrictions on the indicated subframe index $n_{RS}$, it is not (i.e., no longer) possible that a CSI report is based on reference signals present in a subframe with an index $n_{RS}$ before $n_{Trigger}$, and, hence, is outdated and only inaccurately reflects the channel state.

Implementation in LTE

Figure 10:
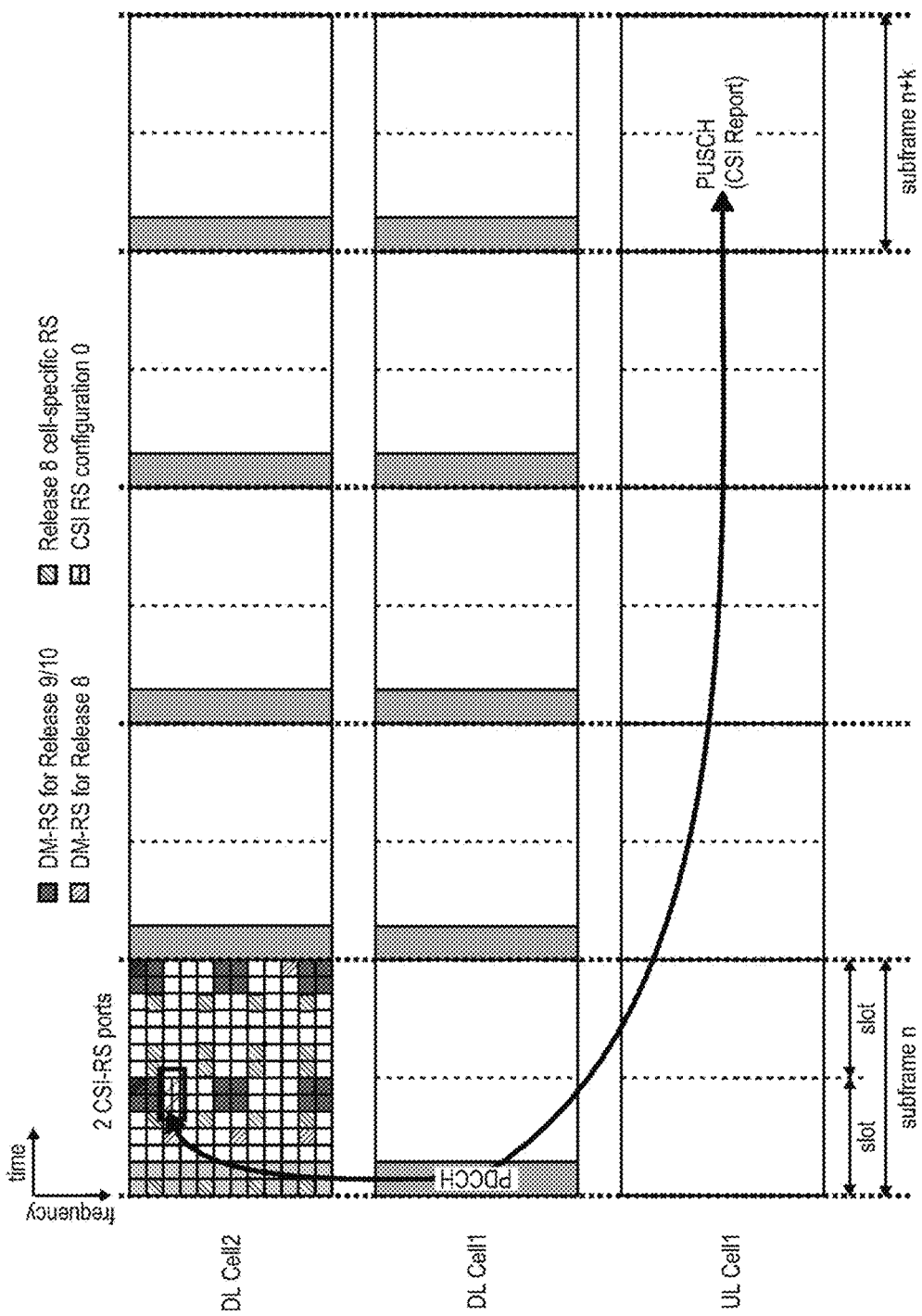
FIG. 10 illustrates a radio communication employing the improved channel state information reporting mechanism according to an implementation of the embodiment.

Now, a more detailed implementation of the above embodiment shall be discussed in connection with FIG. 10. As shown therein, the improved CSI reporting mechanism is illustrated for a mobile communication system in which two downlink component carriers termed "DL Cell 1" and "DL Cell 2" and one uplink component carrier termed "UL Cell 1" are configured for communication between the mobile station and the base station.

This detailed implementation utilizes at least for "DL cell 2" the 2 CSI-RS port configuration for the transmission of CSI reference signals. Specifically, the mobile station is configured at least for "DL cell 2" with a CSI-RS mapping to resource elements according to CSI RS configuration 0 as introduced in the background section, namely, indicating (k', l') as (11, 4) as CSI reference signals on the basis of which the CSI reporting is to be carried out.

Further, the detailed implementation assumes the utilization of CSI reporting mode which prescribes an $n_{RS}$ to $n_{Trigger}$ offset equal to zero. In other words, for purposes of CSI reporting the mobile station is configured to refer to CSI reference signals in the same subframe as the subframe in which the CSI request (i.e., the trigger message) was received.

In the detailed implementation, the mobile station receives on the PDCCH of "DL Cell 1" in subframe $n_{Trigger}$ a DCI format 0 as trigger message including the "CSI request field" indicating (by a value of '1', '01', '10', or '11', depending on the length of the CSI request field and corresponding higher layer configuration; see 3GPP TS 36.213 v12.3.0 clause 7.2.1) that an aperiodic CSI report is triggered. At the same time the trigger message indicates that the CSI is to be reported for "DL Cell 2". Further, the trigger message in DCI format 0 indicates an uplink resource assignment for subframe $n_{Report}$ (which is generally $n_{Trigger}+k$, where k>=4) in "UL Cell 1".

Applying the configuration to refer to the presence of CSI reference signals in the same subframe, i.e., assuming $n_{RS}=n_{Trigger}$, the mobile station refers to CSI reference signals according to CSI RS configuration 0 of "DL Cell 2" within the same subframe as the trigger message, namely, within same subframe $n_{Trigger}$, for measuring/determining the CSI report. On the basis of this CSI reference signals in subframe $n_{RS}$ on "DL Cell 2", the mobile station determines the triggered aperiodic CSI report.

Subsequently, the mobile station transmits the CSI report in the subframe $n_{Report}$ ($=n_{Trigger}+k$) on the uplink resources indicated in the uplink resource assignment of the DCI format 0 trigger message. Moreover, the mobile station is reporting the aperiodic CSI on the basis of CSI reference signals that are present in the subframe n indicated through the received DCI format 0 trigger message.

Aperiodic CSI Reporting Mode

Now, reference is made to a specific implementation of the aperiodic CSI report which shall be understood as a new aperiodic CSI reporting mode which differs from the modes for CSI reporting using PUSCH disclosed in 3GPP TS 36.213 V12.3.0, section 7.2.1. This CSI reporting mode is preferable for an unlicensed carrier. However, it shall be understood that this aperiodic CSI reporting mode is equally applicable for licensed carriers and, hence, shall not be limited in this respect.

This aperiodic CSI reporting mode assumes the reporting of wideband CSI. In other words, reference signals, RS, on the basis of which the aperiodic CSI reporting is performed, are present in a set of sub-bands, S, which is a subset of or spans the downlink system bandwidth of the one or plural downlink component carriers for which the aperiodic CSI report is triggered. It should be noted that the set S can be specific to each downlink component carrier.

More specifically, the aperiodic CSI reporting is carried out in form of one or two channel quality indicator, CQI, value(s) for the set of sub-bands, S, which is a subset of or spans the downlink system bandwidth of the at least one of the plurality of downlink component carriers. Whether one or two CQI value(s) are reported for the set of sub-bands, S, depends on the rank indicator, RI, which is configured for the mobile station.

It is also possible that a first set of subbands S1 of resources where RS are present is different from the second set S2 of resources for which a CQI value is reported. For example, it may be preferable to transmit RS only on a first subset of the downlink system bandwidth of a downlink component carrier, while the CQI value is determined assuming that the measured channel state is applicable to the whole downlink bandwidth of a downlink component carrier and that transmission would occur on the whole downlink bandwidth of the downlink component carrier.

This is similar to obtaining a limited number of samples that is representative of the ensemble or its average. In general, the first and second sets of subbands are configurable independently, where preferably the second set S2 of resources where transmission is assumed is a superset of, or equal to, the first set S1 of resources where RS are transmitted/received.

If the mobile station is not configured to report rank indicator, RI, feedback, or if the to be reported rank indicator equals 1 (RI=1), a single channel quality indicator, CQI, value (corresponding to a codeword) is reported. Further, if the to be reported rank indicator is larger than one (RI>1) two channel quality indicator values (corresponding to different codewords) are reported.

In this respect, the channel state information CSI reporting mode is reported in the form of:
a wideband channel quality indicator, CQI, value per codeword which is calculated assuming downlink transmission using a single precoding matrix in a first set of sub-bands and that the reference signals are present on a second set of sub-bands; and
a selected precoding matrix indicator, PMI, or a first and second precoding matrix indicator corresponding to the selected single precoding matrix.

The single precoding matrix is selected from the codebook subset assuming downlink transmission on the set of sub-bands, S; and the to be reported precoding matrix indicator, PMI, and the to be reported channel quality indicator, CQI, values are calculated conditioned on the reported rank indicator, RI, or are calculated conditioned on RI=1.

In other words, for aperiodic CSI Reports for an unlicensed carrier, a new aperiodic reporting mode is defined, as follows:

A single precoding matrix is selected from the codebook subset assuming transmission on a set S of subbands. A UE shall report a wideband CQI value per codeword which is calculated assuming the use of the single precoding matrix in all subbands and transmission on the set S of subbands. The UE shall report the selected single precoding matrix indicator except with 8 CSI-RS ports configured for transmission modes 9 and 10 or with alternativeCodeBookEnabledFor4TX-r12=TRUE configured for transmission modes 8, 9, and 10, in which case a first and second precoding matrix indicator are reported corresponding to the selected single precoding matrix. For transmission modes 4, 8, 9, and 10, the reported PMI and CQI values are calculated conditioned on the reported RI. For other transmission modes they are reported conditioned on rank 1.

Mapping of CRS and CSI-RS onto Subframe $n_{RS}$

Now, reference is made to a specific implementation of the subframe on which the reference signals, RS, are present. Reference signals shall be understood as at least one of the cell-specific reference signals, CRS, and channel state information reference signals, CSI-RS defined in 3GPP TS 36.211 V12.3.0, section 6.10.1 for CSR and 6.10.5 for CSI-RS.

For the cell-specific reference signals, CRS, the base station configures a cell with a number of so-called CRS ports, which—amongst other purposes—determines the number and location of resource elements where CRS are transmitted in a subframe. The resource element location is further a function of the physical cell ID.

Further, for the channel state information reference signals, CSI-RS, a mobile station is configured with one or plural sets of CSI reference signals. The mapping of CSI reference signal transmissions is pre-configured on a per-subframe basis. Specifically, CSI-RS are used for downlink transmission mode 10.

In more detail, a mobile station may presently be configured with multiple sets of CSI reference signals, namely, up to three configurations for which the mobile station shall assume non-zero transmission power for the CSI-RS (commonly also referred to as NZP-CSI-RS), and zero or more configurations for which the mobile station shall assume zero transmission power (commonly referred to as ZP-CSI-RS) as defined in TS 36.211 under section 6.10.5.2.

In one exemplary implementation, the CRS or CSI-RS transmissions are punctured into potential PDSCH resource elements within the same downlink subframe. This implementation contradicts the general approach that only those resource elements, REs, can be utilized for PDSCH transmission which is not reserved for other purposes (i.e., RSs, synchronization signals, PBCH, and control signaling). Hence, puncturing of the PDSCH would contradict this general approach in that the mobile station would assume at the REs could be reserved for PDSCH but instead carry the CRS or CSI-RS.

In other words, in case a physical downlink shared channel, PDSCH, utilizes the same subframe $n_{RS}$ in which the CRS or CSI-RS are present, the mobile station assumes a punctured PDSCH transmission. However, this implementation is advantageous in that the PDSCH can be decoded irrespective of whether the trigger message for triggering a CSI report on the basis of the CRS or CSI-RS presence was received or not.

In more detail, when a mobile station receives the trigger message for a CSI report then reference signals are indicated for a subframe on the basis of which the CSI is to be reported. Accordingly, the mobile station assumes whether or not corresponding REs are carrying CRS or CSI-RS in the indicated subframe, depending on whether or not the mobile station has received the CSI report indicating the CRS or CSI-RS are present in the subframe.

In this respect, should the mobile station have misconceived or missed the receipt of the CSI trigger indicating that the CRS or CSI-RS are present in a specific subframe, the mobile station can validly assume that the REs are not reserved for other purposes and hence include the punctured PDSCH.

Even if the REs are conversely carrying the CRS or CSI-RS instead of the PDSCH, the mobile station correctly receives, due to the puncturing, the remainder of the allocated PDSCH. The puncturing prevents from downlink buffer corruptions, so that even if CRS or CSI-RS symbols are erroneously included in the decoding of PDSCH, the remaining redundancy provided by forward error correction of the PDSCH can be sufficient to compensate for such an error and therefore still result in a successful decoding of the PDSCH codeword(s).

Further to the CRS and CSI-RS mapping, the mobile station may be configured to use the same or different CRS or CSI-RS to measure the signal strength, S, and/or the interference plus noise strength, I+N. More particularly, the NZP-CSI-RS are well suited for measurement of the signal component within the SINR, and the ZP-CSI-RS are well suited for measurement of the interference plus noise component within the SINR.

Nevertheless, presently the ZP-CSI-RS are configured for channel state information—interference measurement CSI-IM via Radio Resource Control, RRC, layer signalling (also, presently the NZP-CSI-RS are configured by RRC). Instead, in one implementation the improved CSI reporting mechanism indicates reference signals on which the CSI is to be reported utilizing DCI signalling via the PHY layer, by indicating at least one of NZP and ZP RS.

In this respect, in a further exemplary implementation, it is proposed that not only the location (i.e., subframe) of the non-zero-power (NZP) reference signals is indicated in CSI trigger message in form of DCI signalling, but also the location (i.e., subframe) of the zero-power (ZP) reference signals, namely, CRS and/or CSI-RS, is indicated by the same CSI triggering message in form of DCI signalling. As described above, both indications of a subframe may be direct or indirect, for example, based on a prescribed offset relative to CSI trigger message.

The NZP reference signals and the ZP reference do not necessarily have to be in a same subframe. Accordingly, in another exemplary implementation, the mobile station is configured with at least one reference signal configuration including at least one of: a non-zero-power CSI-RS configuration for which the mobile station assumes non-zero transmission power in a subframe $n_{NZP-CSI-RS} = n_{RS}$; and a zero-power CSI-RS configuration for which the mobile station assumes zero transmission power in a subframe $n_{ZP-CSI-RS} \neq n_{RS}$, and, preferably, the subframe $n_{ZP-CSI-RS}$ is earlier than the subframe $n_{NZP-CSI-RS}$, where $$n_{Trigger} \leq n_{ZP-CSI-RS} < n_{NZP-CSI-RS} < n_{Report}.$$

Consequently, each of the CSI-RS follow independently the equation defined with respect to the above described embodiments. The non-zero-power and the zero-power reference signals are not in the same subframe of the one or plural component carriers for which the CSI reporting is triggered but can be carried in different subframes of the one or plural component carriers.

In this respect, burst downlink transmission can reserve more REs in a subframe where only the non-zero-power reference signals are mapped whereas the non-zero-power reference signals are mapped to a preceding, hence, different silent subframe. In this respect, silent period as specified in the regulatory requirements can be optimized, and more resources can be made available for data transmission during an active period.

In a further exemplary implementation, downlink component carrier utilization for unlicensed carriers implementing Listen-Before-Talk, LBT, shall be optimized. In case a CSI report is triggered for such a LBT downlink component carrier, the non-zero-power and the zero-power reference signals are indicated in the trigger message as discussed before. However, a distinction is made with respect to how the base station gains access to such a LBT downlink component carrier.

The base station has to transmit on the LBT downlink component carrier as soon as its availability is detected (e.g., the base station listened and detected that it is free) a signal to reserve its usage for "useful" signal transmissions. Nevertheless, in case of plural downlink, namely, licensed and unlicensed, carriers transmissions must generally be aligned between the carriers. Hence, the necessity for carrier alignment could prevent the base station from immediately starting "useful" signal transmissions on the LBT downlink component carrier.

In this respect, the base station will transmit a "reservation signal" for reserving the LBT downlink component carrier prior to a competing noted blocking the LBT downlink component carrier through its transmission. In this exemplary embodiment it is proposed that the "reservation signal" includes zero-power resource elements which can be used for interference plus noise measurements by the mobile station, and may furthermore also include non-zero-power resource elements which can be used for signal strength measurements by the mobile station.

In other words, as the misalignment prevents "useful" transmissions as part of the "reservation signal" on the LBT downlink component carrier, the base station is forced to postpone all signal transmissions to the next radio frame boundary. Nevertheless, the base station can trigger CSI reporting via a different component carrier and indicate the subframe of the "reservation signal" comprising the zero-power and non-zero-power resource elements for channel state measurements.

According to a further exemplary implementation, the density of the CRS and/or CSI-RS is reduced in the frequency domain. For example, the mapping of CRS and/or CSI-RS is adapted that every second configured CRS and/or CSI-RS (e.g., the even/odd numbered reference signals) are transmitted in form of non-zero-power CRS and/or non-zero-power CSI-RS; whereas the other configured CRS and/or CSI-RS (e.g., the odd/even numbered reference signals) are transmitted in form of zero-power CRS and/or zero-power CSI-RS. This mapping can be configured as part of a CSI reporting mode, or beneficially may also be included in the CIS trigger message in form of the DCI.

As another example, some sub-bands might contain zero-power CRS or zero-power CSI-RS, while other sub-bands might contain non-zero-power CRS or non-zero-power CSI-RS, while yet other sub-bands might contain no CRS or CSI-RS. This serves to keep the resource and power overhead due to RS transmissions low, increasing the efficiency for data transmission, and/or increasing the available transmit power for other resources in the subframe.

According to a further exemplary implementation, the CSI reference signal configuration includes a zero-power CSI-RS configuration for which the mobile station assumes zero transmission power indicating at least one resource element, RE, in the subframe $n_{RS}$ corresponding to a resource element prescribed for cell specific reference signal, CRS, transmission.

This exemplary implementation is discussed in more detail in connection with the following examples of advantageous mapping of CRS and CSI-RS, as illustrated in FIGS. 11 to 19.

For this purpose, no further distinction is made between zero-power and non-zero-power reference signals since the configuration and mapping is equally applicable to both; likewise no further distinction is made between the CRS and CSI-RS for the purpose of estimating the channel state according to the embodiments and implementations. Consequently, only the term "reference signal" (RS) is utilized in the following discussion and corresponding figures.

Figure 7:
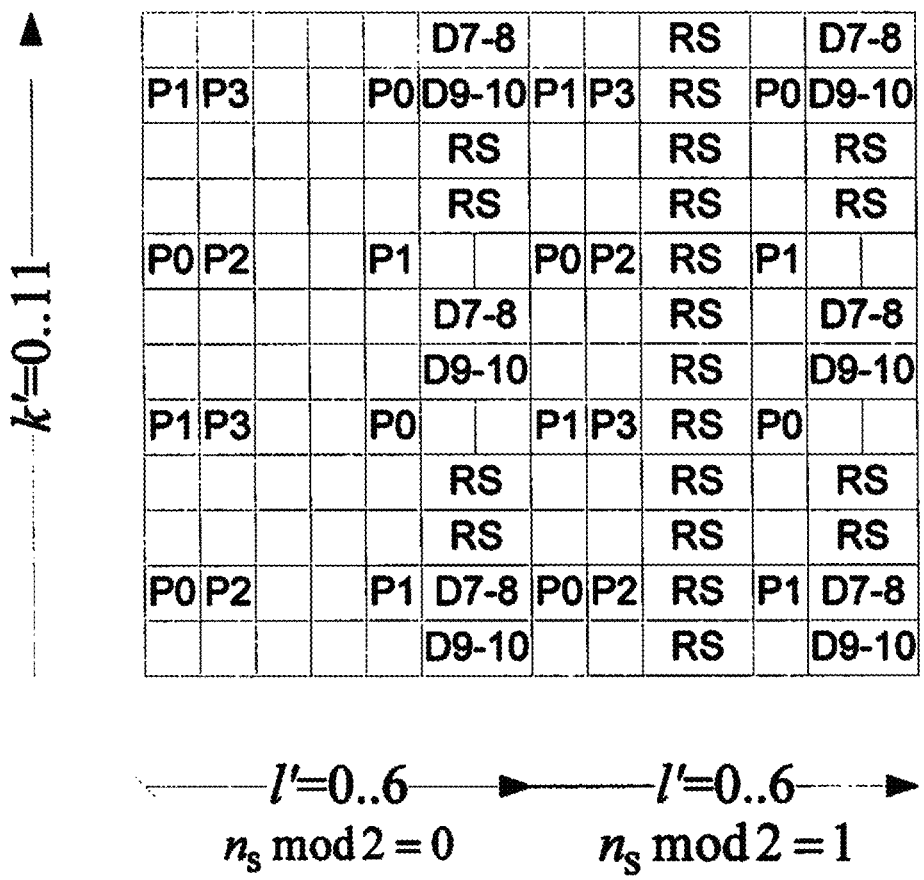
FIG. 7 exemplifies a mapping of resource signals onto a PRB indicating Cell-Specific RSs—CRSs indicated as Px, of Demodulation RSs—DM-RSs indicted as Dx, and Channel State Information RSs—CSI-RSs indicated as RS in the downlink of LTE-A, respectively.
Figure 8:
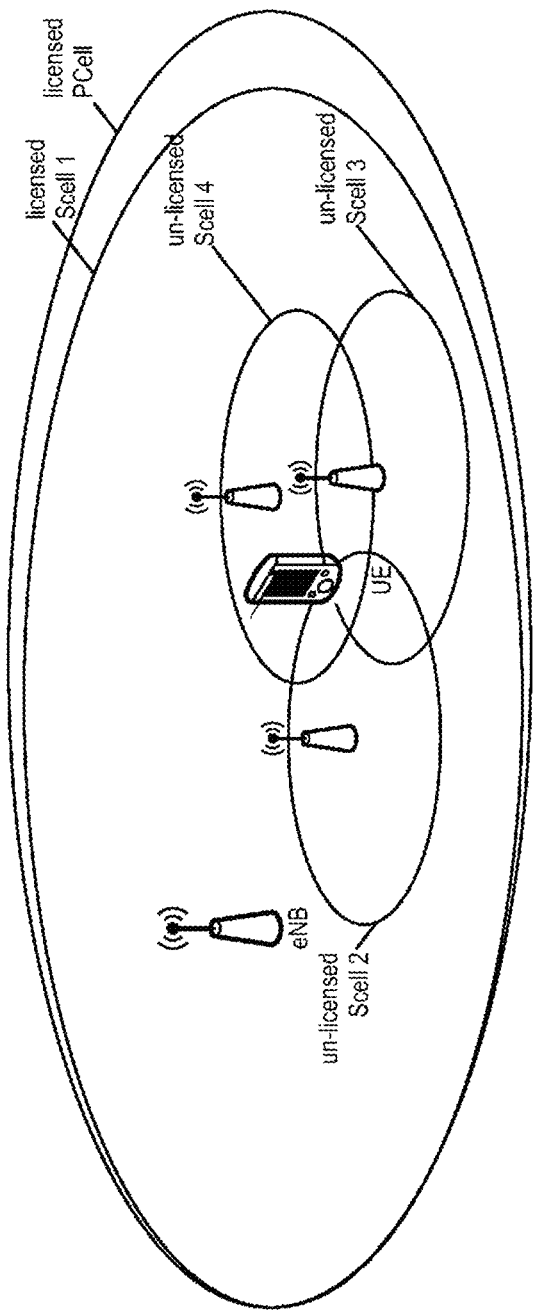
FIG. 8 illustrates an exemplary licensed-assisted access scenario, with various licensed and unlicensed cells.

According to FIG. 7, the state of the art supports time/frequency resources for RS predominantly resources I'=2 in a second slot of a subframe, as well as in resource elements (k', I')={(2, 5), (2, 6), (3, 5), (3, 6), (8, 5), (8, 6), (9, 5), (9, 6)} of each slot of a subframe. P0/P1/P2/P3 denote resource elements for the CRS transmission corresponding to ports 0/1/2/3, respectively, while D7-8 and D9-10 denote resource elements for the UE-specific RS (or DM-RS) transmission corresponding to ports 7-8 and 9-10, respectively. Where applicable, DM-RS for ports 11-12 are mapped to the same resources as for ports 7-8, and DM-RS for ports 13-14 are mapped to the same resources as for ports 9-10.

According to an implementation as exemplified in FIG. 11, the RS for measuring the CSI are mapped onto one or more resource elements that are candidates for CRS port 0/1/2/3 corresponding to l'=0, 1 in the first slot of a subframe. This is particularly reasonable if there is no data transmission in the same subframe, as it enables the earliest possible transmission time of the RS, and therefore a high amount of time for processing is available between the reception of the signal and the corresponding required CSI report, thereby enabling a relatively simple implementation of the measurement and reporting procedures.

It is also reasonable if a PDSCH transmission in the same subframe is done by a transmission scheme that does not rely on CRS for data demodulation, such as in the "Up to 8 layer transmission scheme" supported by transmission modes 9 and 10. It is furthermore beneficial for cases that the RS serve not only for obtaining the CSI, but also to occupy a shared carrier (such as an unlicensed carrier) to block other nodes from accessing the channel; in this case, the RS would serve as a kind of "reservation signal", and is particularly relevant in the beginning of a bursty access to the unlicensed carrier.

Similarly to the notation found in Sesia S, Toufik I, Baker M, "LTE The UMTS Long Term Evolution—From Theory to Practice", Second Edition, 2011, John Wiley & Sons, Ltd., chapter 29.4, in FIG. 29.4, the uppercase character A/B/C denote a given RS configuration, while the lowercase characters x/y/z/u denote corresponding antenna ports.

Consequently, FIG. 11 shows possible configurations for 8 RS ports. In case of configurations for 4 RS ports, corresponding labels Az/Au/Bz/Bu/Cz/Cu would be replaced by Dx/Dy/Ex/Ey/Fx/Fy, respectively, to allow more different RS configurations. Likewise, for configurations for 2 RS ports, additionally corresponding labels Ay/By/Cy/Dy/Ey/Fy would be replaced by Gx/Hx/Ix/Jx/Kx/Lx.

In another implementation, alternative or additional RS configurations can be supported by mapping RS to the second slot of a subframe. A corresponding example for additional RS configurations for the case of 2 RS ports is shown in FIG. 12, where a total of 24 different RS configurations are supported.

Further variants for different mappings are exemplarily shown for the cases of 2, 4, and 8 RS ports in FIGS. 13-17. The figures show the case that a single resource element carries a single antenna port RS, i.e., no further CDM multiplexing is necessary to support different ports on the same resource elements. For this purpose, each RS is represented by an uppercase letter (A/B/C/E) followed by a single number, where identical letters correspond to the same RS configuration and the number indicates the corresponding RS port.

Alternatives in the detailed arrangements are shown, for example, to map equal ports of different configurations to time-adjacent resource elements, or to map different ports of the same RS configuration to time-adjacent resource elements.

Figure 13:
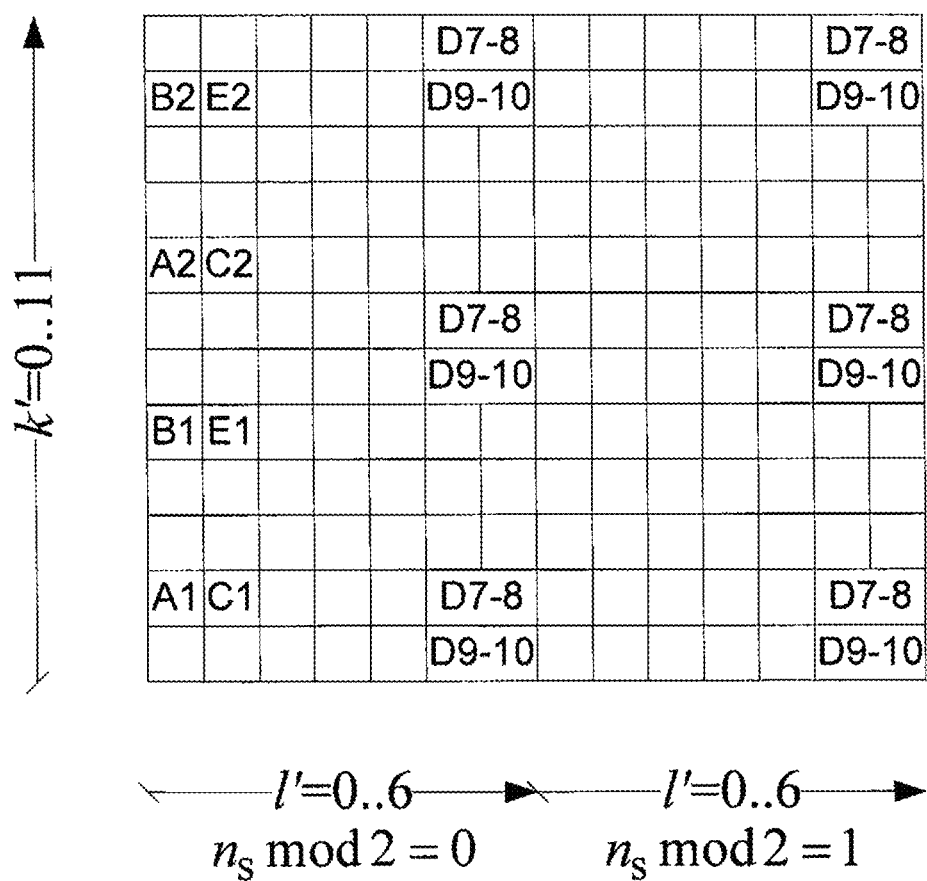
Figure 14:
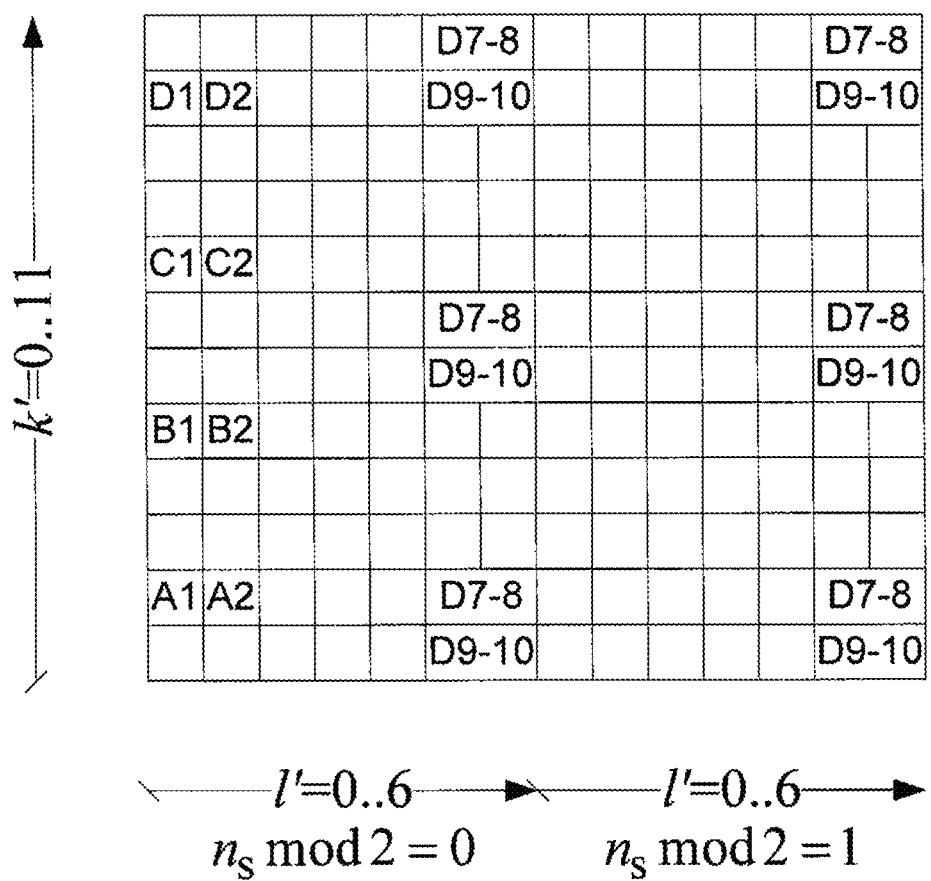
Figure 15:
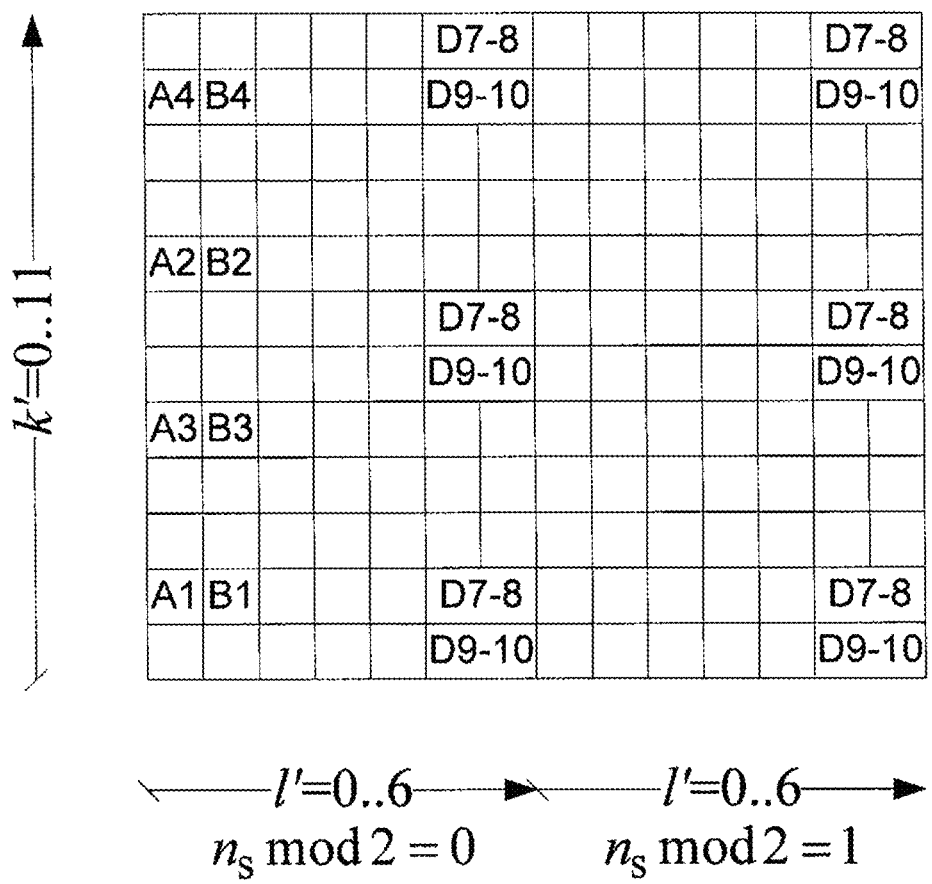
Figure 16:
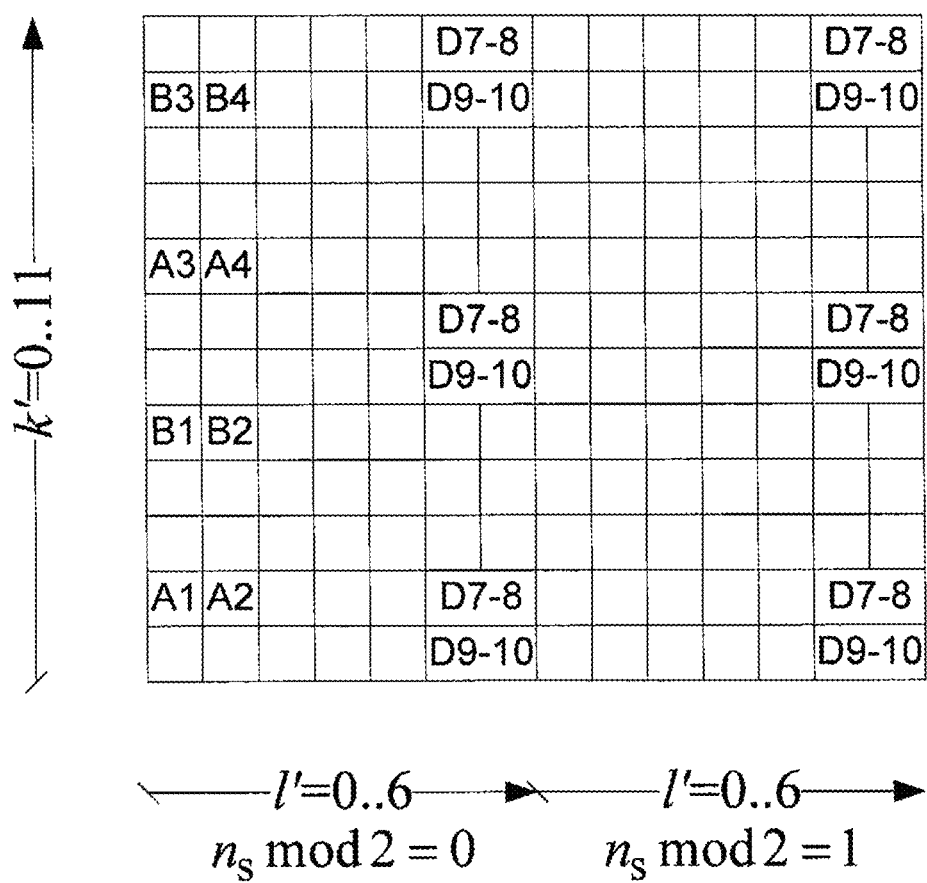
Figure 17:
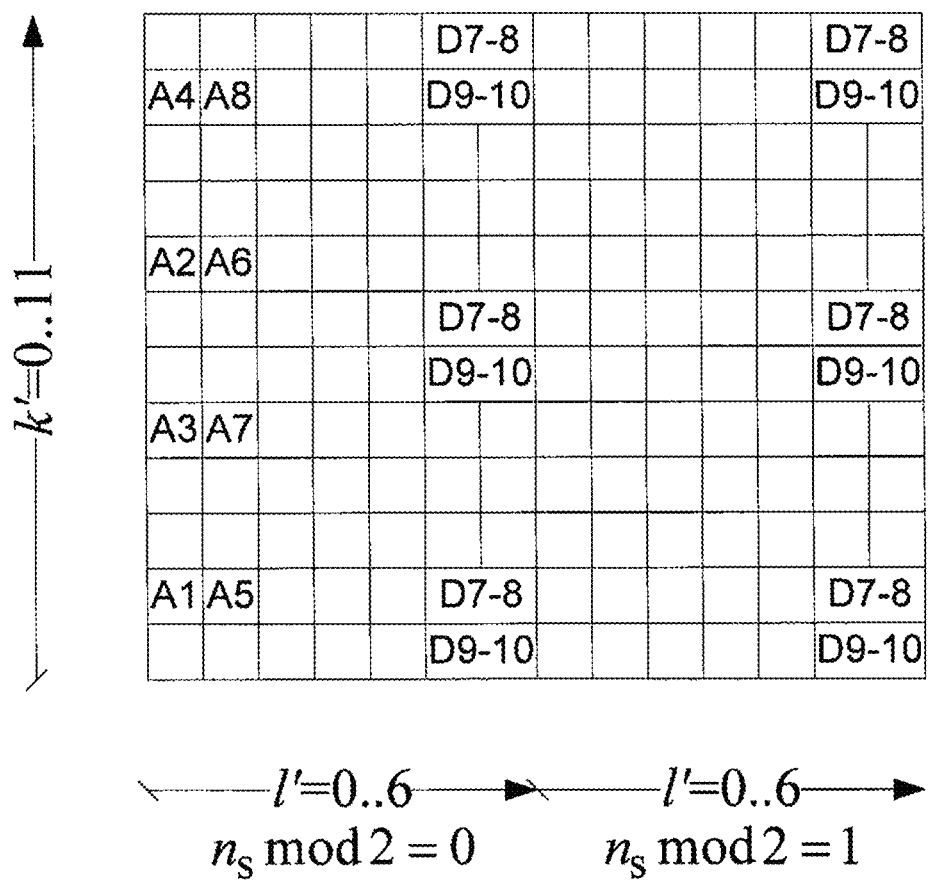

The former has the technical advantage that a better averaging effect can be obtained when combining different RS ports to obtain a channel state estimate, while the latter can expend more transmit power to each RS port in case, e.g., only one configuration is active per subframe and RB; as can be seen, e.g., for the 2 RS port case and configuration A, in symbol l'=0 of the first slot the full transmit power can be spent on symbol A1 in case of FIG. 14 while according to FIG. 13 the transmit power needs to be split among A1 and A2.

FIG. 18 shows another alternative implementation, where not only RS for CSI measurements are transmitted in the beginning and the end of a subframe, but furthermore DM-RS are transmitted in the beginning of the first slot of a subframe. Transmitting DM-RS in the beginning of a subframe can give the benefit that these signals not only serve to provide means to estimate the channel for data demodulation, but also as reservation signals to keep other nodes from assessing the channel as vacant at the beginning of a subframe. Therefore this DM-RS transmission method may be advantageous even in subframe where no RS for CSI estimation (such as CSI-RS or CRS) are transmitted.

In one implementation, the configurations shown exemplarily in FIGS. 11 to 18 are understood to be applicable for every resource block within the system bandwidth of a downlink component carrier. In another implementation, the configurations are applicable only to a subset of resource blocks within the system bandwidth of a downlink component carrier.

This is particularly applicable to reduce the overall overhead incurred by RS transmissions in a subframe. At the same time, when extending this principle to allowing a first RS configuration in a first set of resource blocks and a second RS configuration in a second set of resource blocks, it can be used to effectively support more simultaneous configurations in a subframe.

Figure 19:
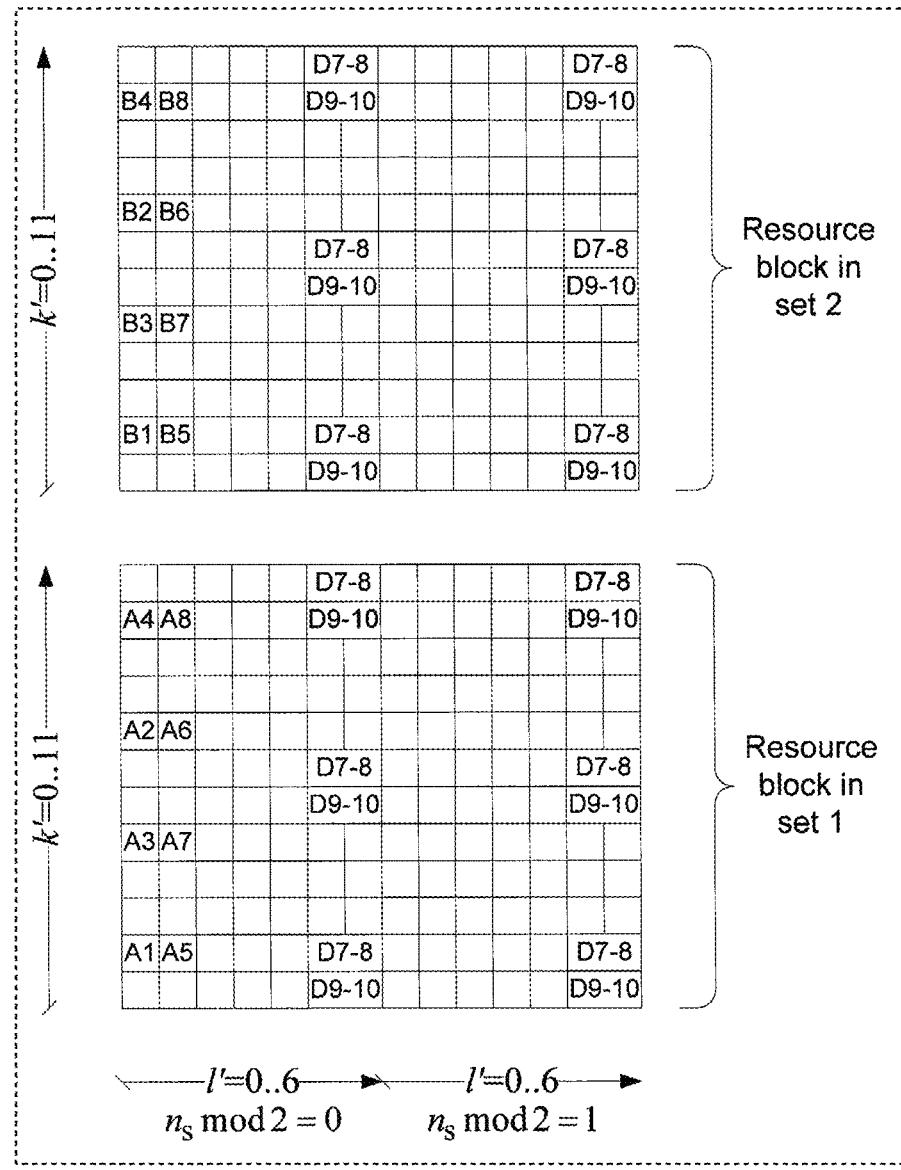
FIG. 19 shows a fifth variant of a mapping of CRS and CSI-RS onto a PRB in set 1 and another PRB in set 2 for use with 8 CSI-RS ports in connection with the improved channel state information reporting mechanism according to another embodiment.

For example, FIG. 19 exemplarily shows two resource blocks of the same subframe supporting 8 RS ports based on FIG. 18. However, in this way a first UE can be configured with RS configuration A in resource block set 1, while a second UE can be configured with RS configuration B in resource block set 2.

Even though configurations A and B can be identical with respect to the resource element location within the resource block for the RS transmission, they can be used for different UEs due to the different detailed configuration for the UEs on which resource block(s) they should expect the RS.

The invention claimed is:

1. A user equipment for reporting channel state information (CSI) to a base station in a communication system in which a plurality of downlink component carriers and at least one uplink component carrier are configured, the user equipment comprising:
a receiver, which, in operation, receives from the base station, in a slot $n_{Trigger}$, a trigger message that triggers reporting of the CSI for at least one unlicensed downlink component carrier of the plurality of downlink component carriers; and
a transmitter, which, in operation, transmits to the base station, in a slot $n_{Report}$ later than $n_{Trigger}$, the CSI for the at least one unlicensed downlink component carrier based on reference signals present, in a slot $n_{RS}$ indicated by the base station, on the at least one unlicensed downlink component carrier,
wherein,
responsive to the at least one unlicensed downlink component carrier being occupied for a period of time for a bursty downlink transmission between the base station and the user equipment, only the reference signals in the slot $n_{RS}$ are evaluated for the CSI, and other slots in the period of time for the bursty downlink transmission are not evaluated for the CSI.

2. The user equipment according to claim 1, wherein the CSI includes:
> a wideband channel quality indicator (CQI) value per codeword, which is calculated assuming use of a single precoding matrix in all sub-bands and assuming downlink transmission on a set of sub-bands (S); and
>
> a selected single precoding matrix indicator (PMI), or a first PMI and a second PMI corresponding to the selected single PMI,
>
> wherein,
>> the single PMI is selected from a codebook subset assuming downlink transmission on the set of sub-bands (S), and
>>
>> the PMI and the CQI values are calculated conditioned on a reported rank indicator (RI) or are calculated conditioned on RI=1.

3. The user equipment according to claim 2, wherein the trigger message indicates that the reference signals are present in the set of sub-bands (S), which spans a downlink system bandwidth of the at least one unlicensed downlink component carrier.

4. The user equipment according to claim 2, wherein the transmitter transmits the CSI including one or two CQI value(s) for the set of sub-bands (S), which spans a downlink system bandwidth of the at least one unlicensed downlink component carrier.

5. The user equipment according to claim 1, wherein the receiver receives the trigger message in a downlink control information (DCI) format.

6. The user equipment according to claim 1, wherein the transmitter transmits the CSI aperiodically, thereby defining an aperiodic CSI report.

7. The user equipment according to claim 1, wherein the receiver receives the trigger message in the slot $n_{Trigger}$ on another one of the plurality of downlink component carriers, which is different from the at least one unlicensed downlink component carrier.

8. The user equipment according to claim 1, wherein the reference signals are at least one of:
> cell-specific reference signals (CRS); or
> channel state information reference signals (CSI-RS).

9. A method implemented by a user equipment for reporting channel state information (CSI) to a base station in a communication system in which a plurality of downlink component carriers and at least one uplink component carrier are configured, the method comprising:
> receiving from the base station, in a slot $n_{Trigger}$, a trigger message that triggers reporting of the CSI for at least one unlicensed downlink component carrier of the plurality of downlink component carriers; and
>
> transmitting to the base station, in a slot $n_{Report}$ later than $n_{Trigger}$, the CSI for the at least one unlicensed downlink component carrier based on reference signals present, in a slot $n_{RS}$ indicated by the base station, on the at least one unlicensed downlink component carrier,
>
> wherein,
>
> responsive to the at least one unlicensed downlink component carrier being occupied for a period of time for a bursty downlink transmission between the base station and the user equipment, only the reference signals in the slot $n_{RS}$ are evaluated for the CSI, and other slots in the period of time for the bursty downlink transmission are not evaluated for the CSI.

10. The method according to claim 9, wherein the CSI includes:
> a wideband channel quality indicator (CQI) value per codeword, which is calculated assuming use of a single precoding matrix in all sub-bands and assuming downlink transmission on a set of sub-bands (S); and
>
> a selected single precoding matrix indicator (PMI), or a first PMI and a second PMI corresponding to the selected single PMI,
>
> wherein,
>> the single PMI is selected from a codebook subset assuming downlink transmission on the set of sub-bands (S), and
>>
>> the PMI and the CQI values are calculated conditioned on a reported rank indicator (RI) or are calculated conditioned on RI=1.

11. The method according to claim 10, wherein the trigger message indicates that the reference signals are present in the set of sub-bands (S), which spans a downlink system bandwidth of the at least one unlicensed downlink component carrier.

12. The method according to claim 10, wherein the CSI includes one or two CQI value(s) for the set of sub-bands (S), which spans a downlink system bandwidth of the at least one unlicensed downlink component carrier.

13. The method according to claim 9, wherein the trigger message is received in a downlink control information (DCI) format.

14. The method according to claim 9, wherein the CSI is transmitted aperiodically, thereby defining an aperiodic CSI report.

15. The method according to claim 9, wherein the trigger message is received in the slot $n_{Trigger}$ on another one of the plurality of downlink component carriers, which is different from the at least one unlicensed downlink component carrier.

16. The method according to claim 9, wherein the reference signals are at least one of:
> cell-specific reference signals (CRS); or
> channel state information reference signals (CSI-RS).

* * * * *